(12) United States Patent
Katase

(10) Patent No.: US 6,525,865 B2
(45) Date of Patent: Feb. 25, 2003

(54) ELECTROPHORETIC DISPLAY AND METHOD FOR PRODUCING SAME

(75) Inventor: Makoto Katase, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/865,573

(22) Filed: May 29, 2001

(65) Prior Publication Data

US 2002/0008898 A1 Jan. 24, 2002

(30) Foreign Application Priority Data

May 30, 2000 (JP) ........................................ 2000-160623

(51) Int. Cl.⁷ ........................... G02B 26/00; G09G 3/34; G03G 17/04
(52) U.S. Cl. ........................... 359/296; 345/107; 430/32
(58) Field of Search ........................... 204/450; 345/107; 359/296; 430/32

(56) References Cited

U.S. PATENT DOCUMENTS

| 3,668,106 | A | | 6/1972 | Ota ............................. 358/303 |
| 6,327,072 | B1 | * | 12/2001 | Comiskey et al. .......... 359/296 |
| 2002/0005832 | A1 | * | 1/2002 | Katause ...................... 345/107 |
| 2002/0021483 | A1 | * | 2/2002 | Katause ...................... 359/267 |

FOREIGN PATENT DOCUMENTS

| JP | 49-32038 | | 8/1974 | |
| JP | 50-15115 | | 6/1975 | |
| JP | 5-307197 | | 11/1993 | |
| JP | 6-507730 | | 9/1994 | |
| JP | 07072807 A | * | 3/1995 | ............. G09F/9/30 |
| JP | 8-502599 | | 3/1996 | |
| WO | WO 92/21733 | | 12/1992 | |
| WO | WO 94/09187 | | 4/1994 | |

OTHER PUBLICATIONS

Kawai et al., "Microcapsule–type Electrophoretic Display (MC–EPD)", *Japan Haardcopy '99*, 237–240 (w/English abstract).
Kawai, "Microcapsule–type Electrophoretic Display (MC–EPD)", *Journal of the Imaging Japan Hardcopy '99*, vol. 38, No. 2, pp. 51–56.

* cited by examiner

*Primary Examiner*—Georgia Epps
*Assistant Examiner*—David N. Spector
(74) *Attorney, Agent, or Firm*—Oliff & Berridge, PLC

(57) ABSTRACT

A method for producing an electrophoretic display panel is provided. In the first process, elements including TFTs are formed on an element substrate, thereby pixel electrodes being produced thereon. In the second process, a bulkhead is placed on the element substrate. In the third process, an ink jet type of dispersion charging apparatus is used to charge the dispersion into divided cells partitioned by the bulkhead. In the fourth process, an upper opening of the bulkhead is sealed with a sealer. And in the fifth process, an opposing substrate on which a common electrode is formed is applied to the sealer in a manner that the common electrode faces the pixel electrodes.

30 Claims, 22 Drawing Sheets

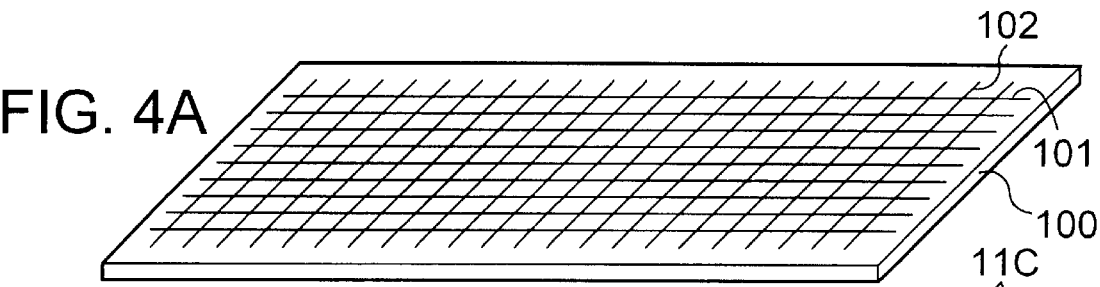
FIG. 4A
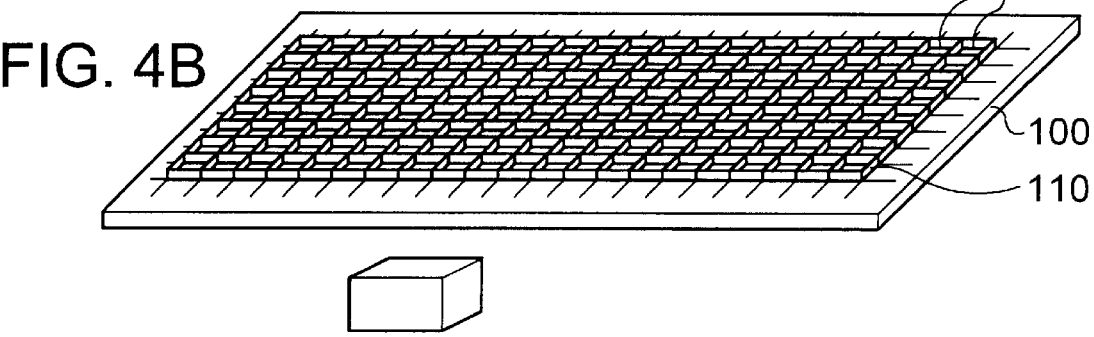
FIG. 4B
FIG. 4C
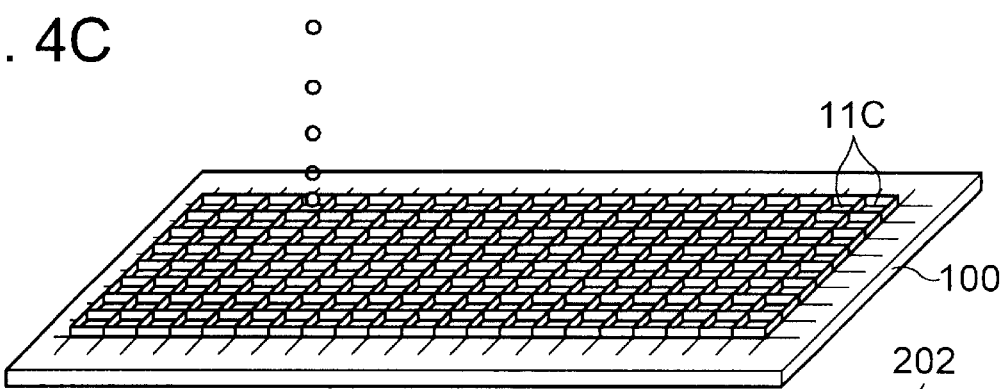
FIG. 4D
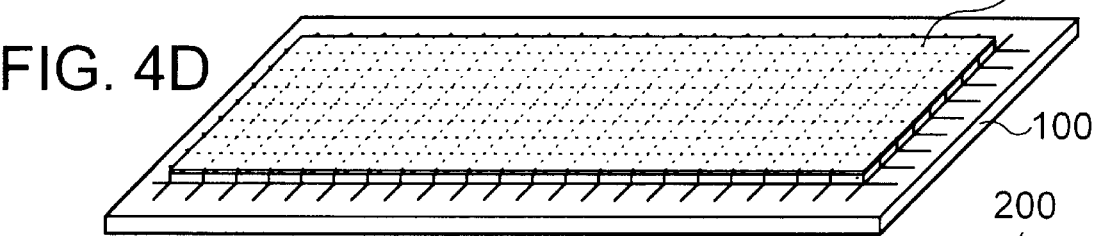
FIG. 4E
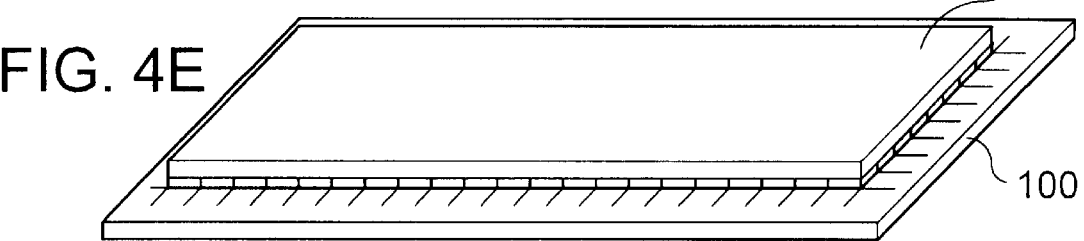

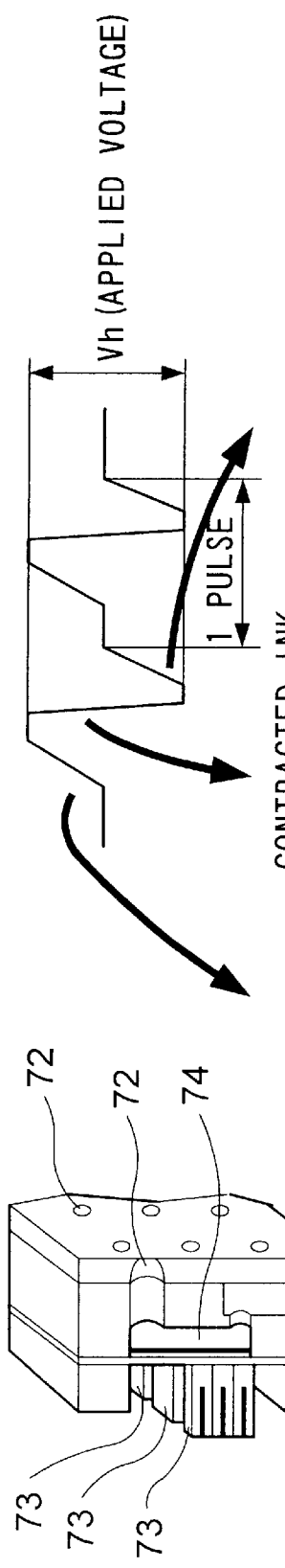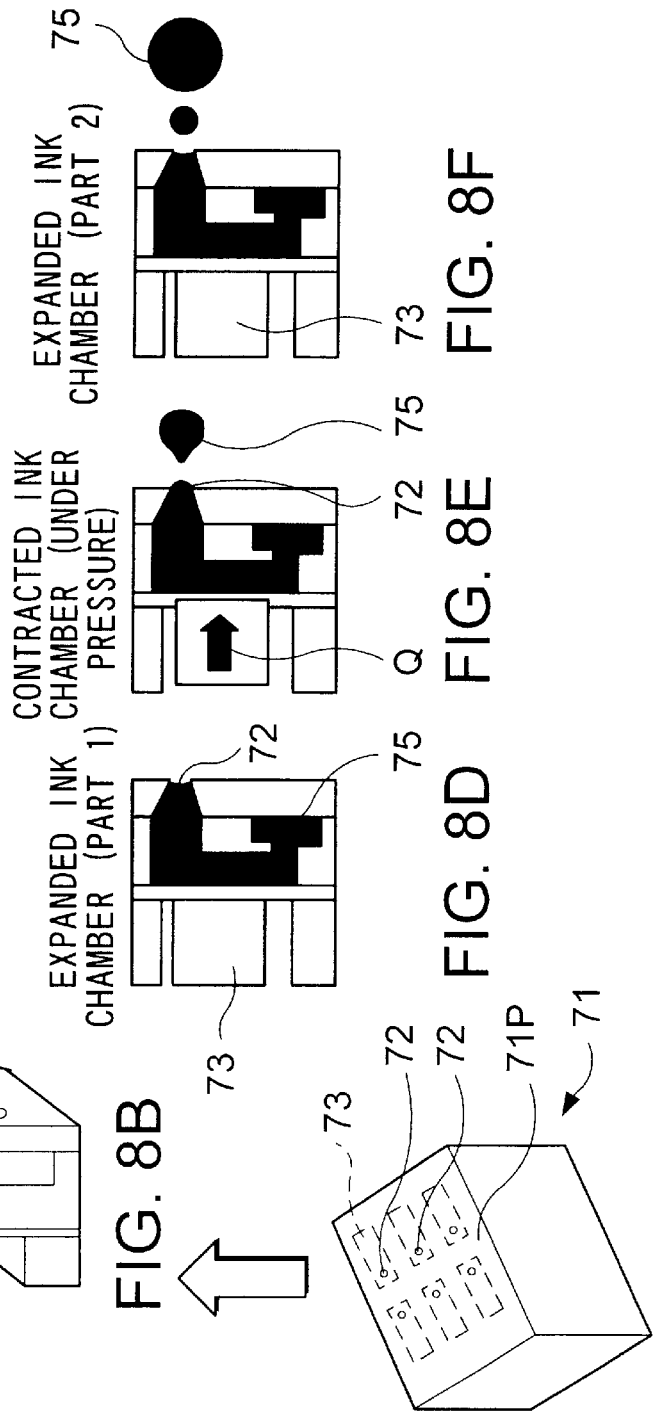

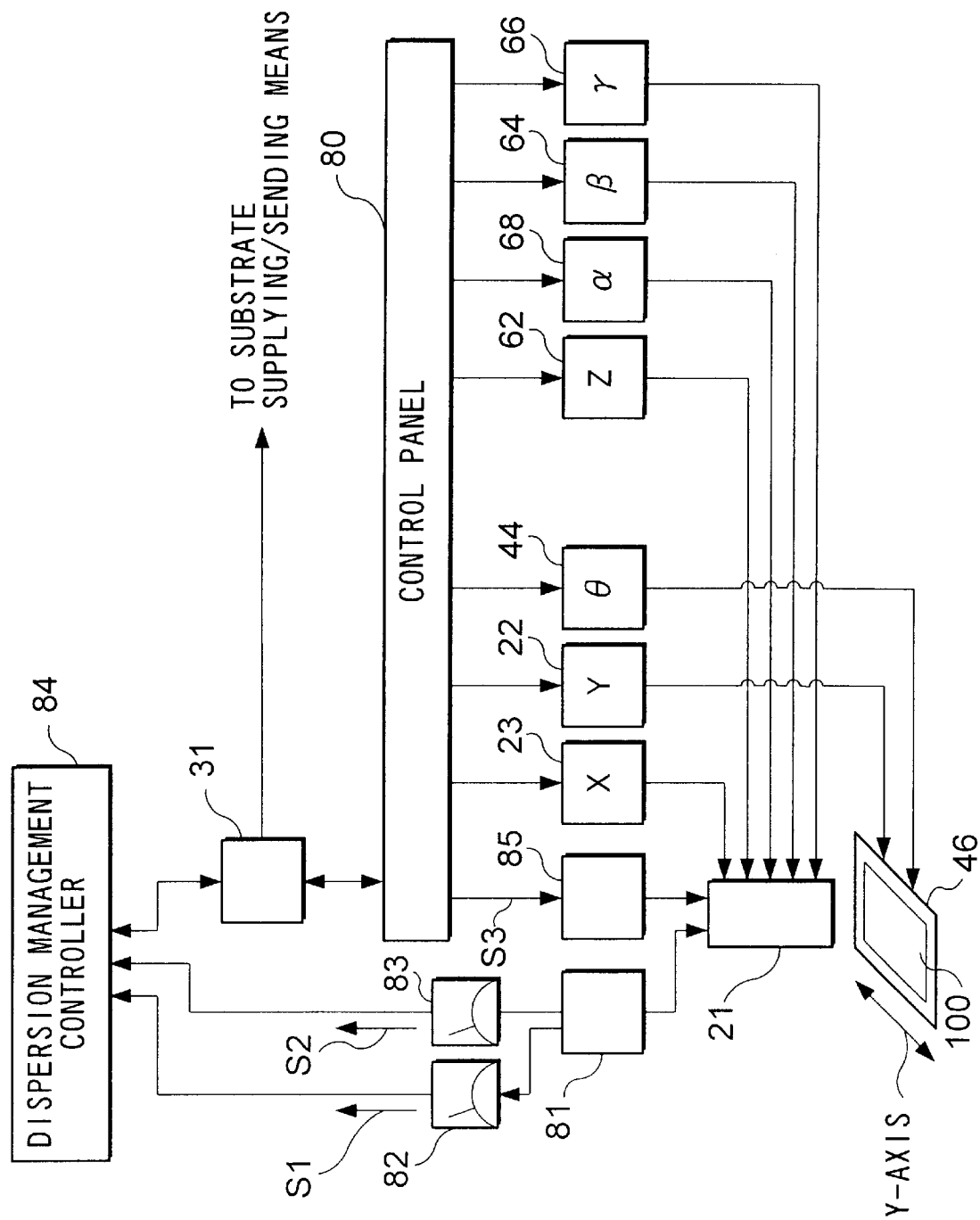

ELECTROPHORETIC DISPLAY AND METHOD FOR PRODUCING SAME

BACKGROUND OF THE INVENTION

1. Field of the Invention

The present invention relates to an electrophoretic display in which a dispersion containing electrophoretic particles is enclosed into a plurality of divided cells partitioned by a bulkhead and to a method for producing the electrophoretic display.

2. Related Art of the Invention

Electrophoretics utilizing electrophoresis phenomenon have been known as devices of non-luminous type. The electrophoresis is a phenomenon where particles (electrophoretic particles) migrate due to a Coulomb's force when applying an electric field to a dispersion composed of liquid (dispersion medium) in which the particles are dispersed.

Fundamentally, the electrophoretic display has two electrodes facing each other at a predetermined length gap and dispersion inserted between the electrodes. When applying a potential difference to both electrodes, charged electrophoretic particles are pulled to either of the electrodes by the electric field generated between the electrodes. The electrode to which the particles are pulled depends on the direction of the electronic field. The dispersion medium is dyed with a dye and the electrophoretic particles are made from pigment particles, with the result that an observer can view the color of either electrophoretic particles or dye. Therefore, from a principle point of view, patterning one of the electrodes and controlling voltage applied to the electrodes enables images to be displayed.

However, since the dispersion is made of liquid, that is, flowing fluid, the electrophoretic particles scatter even when a pattern is made on an electrode, thereby resolution in display being deteriorated. To avoid such a drawback, there has been proposed a technique by a Japanese Patent Publication No. 49-32038. This publication discloses a configuration in which a bulkhead is arranged to enclose dispersion into divided minute cells. Thus electrophoretic particles contained in the dispersion are allowed to move only within each cell.

The above publication fails to disclose, however, how to fill the dispersion into each of the divided cells. Thus, electrophoretics could not be produced based on the configuration disclosed by the above patent publication.

SUMMARY OF THE INVENTION

An object of the present invention, which has been made to overcome such a situation that the conventional technique encounters, is to provide an electrophoretic display and a method for producing the same which are able to fill dispersion into each divided cell.

To achieve the above object, the present invention provides a method for producing an electrophoretic display, the method comprising a process of providing a bulkhead on a substrate so as to partition a space on the substrate into a plurality of divided cells; and a process of ejecting dispersion containing electrophoretic particles toward an opening of the bulkhead as a droplet, to charge the divided cells with the dispersion. In this method, the dispersion is ejected toward an opening of the bulkhead as a droplet, thereby each divided cell being charged with the dispersion. Because the dispersion is ejected into the divided cells as a droplet, the dispersion can be charged in a steady manner even when the divided cells are minute in size. For ejecting droplets of the dispersion, an ink jet type of ejection apparatus can be used. This enables mass production of electrophoretics with greatly shorter pixel pitches and higher fineness in display under high reliability of manufacturing.

In a preferred embodiment, the method for producing an electrophoretic display, comprising a process of providing a bulkhead on a first substrate so as to partition a space on the substrate into a plurality of divided cells; a process of ejecting a dispersion containing electrophoretic particles toward an opening of the bulkhead as a droplet, to charge the divided cells with the dispersion; a process of sealing the opening of the bulkhead with a sealer; and a process of applying a second substrate to the sealed first substrate. In this method, after the dispersion is charged into each divided cell, the opening of the bulkhead is sealed, which makes it possible to securely keep the dispersion within the divided cells. Once charged in the divided cells, there is no fear that the dispersion may leak therefrom. In addition, since no extraneous material is mixed into the dispersion, its intermediate products are easier to handle, thus providing an improved yield.

In the above production method, the method may further comprise processes of forming, on one of surfaces of the first substrate, a plurality of data lines, a plurality of scanning lines, a plurality of switching elements each placed according to each of intersections made between the scanning lines and the data lines, and a plurality of pixel electrodes each electrically connected with each switching element, the processes being carried out before the bulkhead is formed on the one of the surfaces of the first substrate. For instance, thin film transistors can be used as the switching elements. The data lines, scanning lines, and switching elements can be formed on the substrate in the processes of production of the apparatus.

In the above production method, it is preferred that the second substrate is transparent, and the method further comprises a process of forming a transparent common electrode onto the second substrate before the second substrate is applied to the sealed first substrate. This makes it possible to manufacture an active matrix type of electrophoretic display. Further, because both of the common electrode and the second substrate are made to be transparent, the second substrate has a surface on which the common electrode is not formed, so the surface can be used as a display surface.

It may also be configured that conductivity is partly or entirely given to the bulkhead, of which conductive part is used as a common electrode paired with the pixel electrodes. It may also be configured that the sealer may have conductivity and be used as a common electrode paired with pixel electrodes. It may also be configured that the sealing process includes a process of sealing the opening of the bulkhead using a non-conductive sealer employed as the sealer, and a process of giving conductivity to the non-conductive sealer. Moreover, after the opening of the bulkhead is sealed with a non-conductive sealer employed as the sealer, conductivity may be given to the non-conductive sealer, then the sealed first substrate may be applied to the second substrate. These embodiments cause the process to form the common electrode to be omitted.

In the foregoing production method, another alternative is that either one of a plurality of row electrodes or a plurality of column electrodes are formed on one of surfaces of the first substrate, and the other of the plurality of row electrodes and the plurality of column electrodes are formed on the second substrate in advance, wherein the bulkhead is formed onto the one of the surfaces of the first substrate. This method allows one to produce a passive matrix type of electrophoretic display.

For forming the bulkhead by using the foregoing production method, an alternative may be adopted in which, in the ejecting, a material of the bulkhead is ejected toward the first substrate as the droplet, thereby the bulkhead being formed. In this case, an ink jet type of ejecting apparatus can be used as a droplet ejecting apparatus. This enables a bulkhead material to be layered at a desired location with high precision, providing a minutely structured bulkhead.

Further, in forming the bulkhead by using the foregoing production method, it is preferred that the bulkhead is formed by pressing a material of the bulkhead with a stamper. This method makes it possible to manufacture finely structured bulkheads with higher productivity.

In the foregoing production method, an alternative may be configured such that a plurality of data lines, a plurality of scanning lines, a plurality of switching elements each placed according to each of intersections made between the scanning lines and the data lines, and a plurality of pixel electrodes each electrically connected with each switching element are previously formed on the second substrate, and the bulkhead formed by the stamper is applied to the first substrate to form the bulkhead on the first substrate.

Preferably, the first substrate is transparent, and on the first substrate is formed a transparent common electrode paired with the pixel electrode. Thus, an active matrix type of electrophoretic display can be manufactured.

It may also be configured that the sealer may have conductivity and be used as a common electrode paired with pixel electrodes.

A further configuration may be formed in a manner that a material of the bulkhead is a sheet-like conductive member covered by a resin member, the material of the bulkhead is pressed with the stamper so that the divided cells are formed on one of surfaces of the conductive member, thereby the bulkhead being produced, and the bulkhead is applied to the first substrate so as to form the bulkhead on the first substrate, in which the conductive member is used as a common electrode paired with the pixel electrodes. In this configuration, the common electrode can be manufactured concurrently with manufacturing of the bulkhead with the stamper, with the result that the manufacturing processes can be simplified.

Also, another configuration may be formed in a manner that a plurality of data lines, a plurality of scanning lines, a plurality of switching elements each placed according to each of intersections made between the scanning lines and the data lines, and a plurality of pixel electrodes each electrically connected with each switching element are previously formed on the second substrate, the bulkhead formed by the stamper is coated partly or entirely with a conductive material, in which a part of the bulkhead, which is coated with the conductive material, is used as a common electrode paired with the pixel electrodes, and the coated bulkhead is applied to the first substrate so that the bulkhead is formed on the first substrate. In this case, the process to form the common electrode can be removed.

Also, another configuration may be formed in a manner that the bulkhead is partly or entirely arranged at a boundary of pixels. When arranged at the entire boundary, the pixels are able to correspond to the divided cells one by one. This will lead to manufacturing of electrophoretics capable of visualizing high-quality images.

Also, another configuration may be formed in a manner that the bulkhead is formed with a bulkhead material which is black. In the case of display in colors, a black matrix is used. When the bulkhead is composed of a black bulkhead material in such a case, the bulkhead and the black matrix can be used in common, so that a process to form the black matrix can be omitted.

Also, another configuration may be formed in a manner that the sealer is made of material to be fluidized by heating, in which the sealer is disposed at the opening of the bulkhead, and the opening of the bulkhead is sealed by heating the disposed sealer. According to the present invention, mixed bubbles in charging the dispersion can be expelled out by heating, thus improving a charging rate of the dispersion. An electrophoretic display capable of displaying high-quality images can therefore be manufactured.

Also, another configuration may be formed in a manner that the sealer is made of material not to be mixed with the dispersion, wherein the sealer is coated or spayed on the first substrate in which the dispersion is charged and the opening of the bulkhead is sealed by hardening the sealer. This configuration makes it possible to place the sealer on the dispersion without a gap. Therefore, electrophoretic displays capable of displaying images in high quality can be manufactured.

Still, it is preferred that the sealer is made of material greater in relative gravity than the dispersion and not to be mixed with the dispersion, wherein the dispersion to which the sealer is added is ejected toward each of the divided cells when the dispersion is ejected as a droplet, thereby both of the dispersion and the sealer being charged into the cells, and then the opening of the bulkhead is sealed by hardening the sealer when the dispersion and the sealer are separated from each other in each of the divided cells. This configuration can exclude a gap between the sealer and the dispersion. Additionally, a process to coat or spray the sealer can be omitted. It is therefore possible to manufacture an electrophoretic display capable of displaying high-quality images in higher productivity.

Another configuration may be realized in a manner that a porous sheet having a plurality of pores is made to adhere to the first substrate on which the bulkhead is formed, wherein the dispersion is ejected, as the droplet, through the pores toward the first substrate to which the porous sheet adheres, and the pores are sealed by ejecting the sealer as a droplet toward each pore. In this case, since a thickness of the dispersion is dependent on the porous sheet, the thickness can be uniform over the entire screen. In consequence, it is possible to manufacture an electrophoretic display which has a capability to visualize high-quality images with no irregularities in depiction.

According to another aspect of the present invention, there is provided an electrophoretic display for performing a desired display by changing a spatial state of electrophoretic particles pixel by pixel, comprising a bulkhead partitioned into a plurality of divided cells and disposed partly or entirely at a boundary of the pixels, dispersion containing the electrophoretic particles to be charged into each of the plurality of divided cells, and a pair of electrodes fixedly sandwiching the dispersion, at least one electrode being transparent. In this invention, the bulkhead is located at boundaries of pixels, so that a decrease in a numerical aperture, which lowers dependently on a thickness of the bulkhead, can be minimized.

In this configuration, if the display is made on a plurality of different hues each assigned to each pixel in accordance with a predetermined rule, it is preferred that the bulkhead is disposed at least at a boundary of pixels whose display hues are different from each other. This allows display in colors. Alternatively, it is preferred that the bulkhead is black, because the bulkhead can be used in common with a black matrix.

In the foregoing electrophoretic display, it is preferable to comprise a sealer for sealing the charged dispersion. It is also preferred that the sealer has conductivity and consists of the one electrode used in common with the sealer. Still, preferable is that the bulkhead has conductivity in partly or entirely, part of the bulkhead, which has conductivity, being used in common with the one electrode.

Alternatively, the foregoing electrophoretic display may be configured in such a way that it comprises a first substrate on which a plurality of data lines, a plurality of scanning lines, a plurality of switching elements each disposed correspondingly to an intersection made between each scanning line and each data line, and a plurality of pixel electrodes each electrically connected with each switching element, and a second substrate on which a common electrode is formed, wherein the bulkhead is fixedly sandwiched between the first and second substrates, the one electrode being the common electrode and the other electrode being the pixel electrodes. Accordingly, this configuration is able to provide an active matrix type of electrophoretic display of which numerical aperture is higher.

Alternatively, the foregoing electrophoretic display may have a first substrate on which a plurality of first electrodes are placed and a second substrate on which a plurality of second electrodes are placed, wherein the bulkhead is fixedly sandwiched between the first and second substrates. This configuration is able to provide a passive matrix type of electrophoretic display of which numerical aperture is higher.

As another aspect of the present invention, there is provided an electric device provided with one of the foregoing various types of electrophoretic displays. By way of example, the electric device is an electronic book, personal computer, portable phone, electronic advertisement board, electronic road sign, or others.

BRIEF DESCRIPTION OF THE DRAWINGS

In the accompanying drawings:

FIGS. 4A to 4E illustrate a production method of the panel;

FIGS. 8A to 8F exemplify the configuration of an ink jet head used by the dispersion charging apparatus;

FIG. 9 is a block diagram showing an electrical configuration of the dispersion charging apparatus;

DETAILED DESCRIPTION OF THE PREFERRED EMBODIMENTS

Referring to the accompanying drawings, preferred embodiments of the present invention will now be described.

(1) First embodiment (1.1) Outline of electrophoretic display

Figure 1:
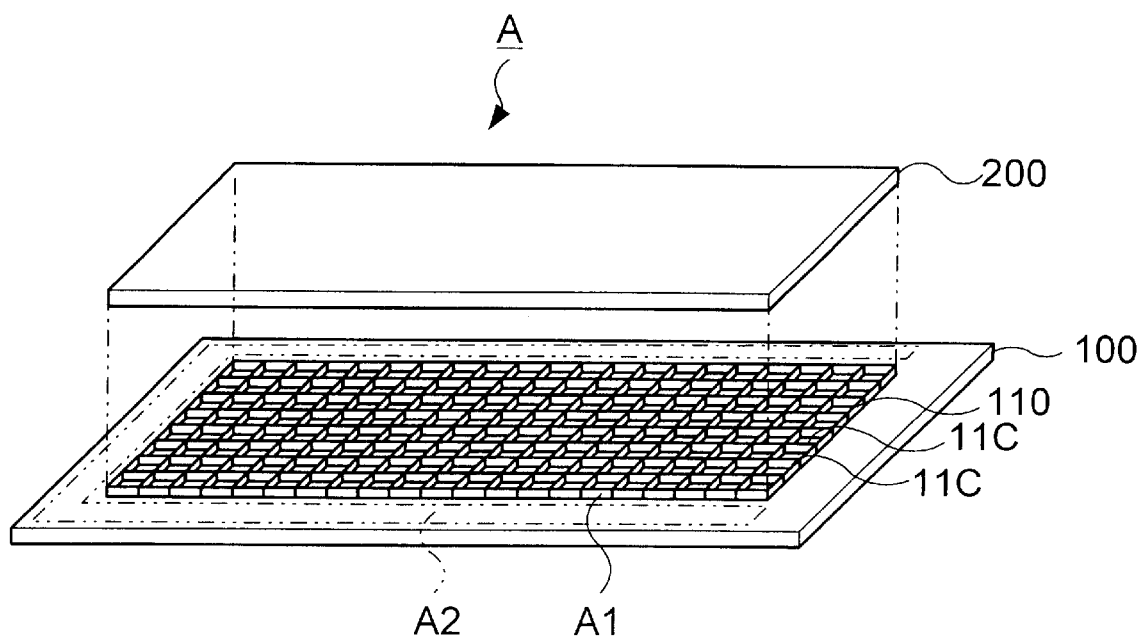
FIG. 1 is an exploded perspective view showing a mechanical configuration of an electrophoretic display panel according to a first embodiment of the present invention.

An electrophoretic display of the present embodiment has an electrophoretic display panel and a peripheral circuit thereof. First, the mechanical configuration of the electrophoretic display panel will be described. FIG. 1 is an exploded perspective view showing the mechanical configuration of an electrophoretic display panel according to a first embodiment of the present invention, while FIG. 2 is a partial sectional view of the panel.

Figure 2:
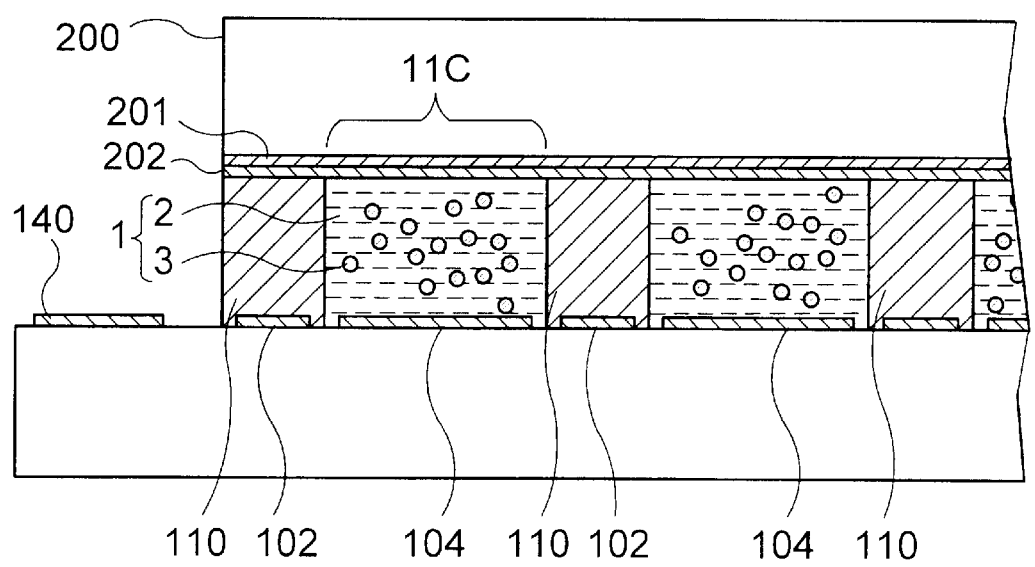
FIG. 2 is a partial sectional view of the panel.

As shown in FIGS. 1 and 2, an electrophoretic display panel A has an element substrate 100, made of glass, semiconductor, and others, on which pixel electrodes 104 and others are formed and sealed with a sealer 202, and an opposing substrate 200 on which a common electrode 201 and others are formed. Both substrates 100 and 200 are applied together so that the electrode-formed surfaces thereof are opposed to each other at intervals with a bulkhead 110 of a certain height inserted therebetween, in which dispersion 1 is charged in a space formed in the bulkhead 110. The opposing substrate 200, common electrode 201, and sealer 202 are transparent. An observer, who is at the outside of the opposing substrate 200 opposite to the common electrode 201, can see displayed images through the opposing substrate 200.

The dispersion 1 is a material in which electrophoretic particles are dispersed into a dispersion medium 2. The dispersion medium 2 is composed of an additive such as a surface-active agent, which is added according to its necessity. In the dispersion 1, to avoid sedimentation of the electrophoretic particles 3 owing to gravity thereof, both dispersion medium 2 and electrophoretic particles 3 are chosen to be approximately equal in specific gravity to each other.

The bulkhead 110 according to this embodiment is formed to partition a space into pixels which corresponds to a unit of an image. The spaces partitioned by the bulkhead 110 are called divided cells 11C, which are charged with the dispersion 1. Since a large number of divided cells 11C are placed by the bulkhead 110, ranges in which electrophoretic particles 3 are able to migrate are limited to the inner space of each divided cell 11C. The dispersion 1 may cause a phenomenon of condensation in which dispersion of particles are unbalanced or a plurality of particles are combined together to form a lump. However, using a plurality of divided cells 11C formed by the bulkhead 110 enables such a phenomenon to be prevented from appearing. It is therefore possible to improve quality of displayed images.

The electrophoretic display panel A is produced as to display images in full colors, because each pixel has a capability of displaying images in one of the three primary colors (RGB). In order to cope with this, the dispersion 1 consists of three types of dispersion corresponding to R, G and B colors, respectively. In the following description, when it is necessary to express the dispersion 1, dispersion medium 2 and electrophoretic particles 3 correspondingly to each color, subscripts "r," "g," and "b" are added thereto.

In this embodiment, the dispersion 1r corresponding to R color uses red particles as the electrophoretic particles 3r and the dispersion medium 2r is a cyanogen-color medium. The electrophoretic particles 3r are made of iron oxide, for example. The dispersion 1g corresponding to G color uses green particles as the electrophoretic particles 3g and the dispersion medium 2g is a magenta-color medium. The electrophoretic particles 3g are made of cobalt-green pigment particles, for example. The dispersion 1b corresponding to B color uses blue particles as the electrophoretic particles 3b and the dispersion medium 2b is a yellow medium. The electrophoretic particles 3b are made of cobalt-blue pigment particles, for example.

That is, the electrophoretic particles 3 that correspond to each color to be displayed are used, while the dispersion medium 2 of a certain color (complementary color, in this embodiment) that absorbs the color to be displayed is used. Thus, if the electrophoretic particles 3 float up to the display-surface-side electrode, light of a wavelength agreeing with a color to be displayed is reflected by the electrophoretic particles 3. An observer is able to recognize the color with the reflected light. On the other hand, when the electrophoretic particles 3 sink down to the opposite-side electrode to the display surface, light of a wavelength agreeing with the color to be displayed is absorbed by the dispersion medium 2. In this case, the light cannot reach an observer, so the observer cannot recognize the color. By the way, the strength of an electric field applied to the dispersion 1 is able to control how the electrophoretic particles 3 are distributed in the thickness direction of the dispersion 3. Using a combination of the electrophoretic particles 3 and the dispersion medium 2 absorbing light reflected by the particles and controlling the electric field strength will lead to adjustment of an absorption rate of light reflected by the electrophoretic particles 3. As a result, the strength of light to reach an observer can be controlled.

A display area A1 and a peripheral area A2 are provided on one of the surfaces of the element substrate 100 which faces with the opposing substrate 200 and on which the bulkhead 110 is disposed. In the display area, in addition to the pixel electrodes 104, thin film transistors (hereinafter, referred to as TFTs) are formed so as to function as scanning lines, data liens, and switching elements which will be described later. In the peripheral area A2 of the surface of the element substrate 100, a scanning line deriving circuit, data line driving circuit, and externally-connected electrodes which will be described later are formed.

Figure 3:
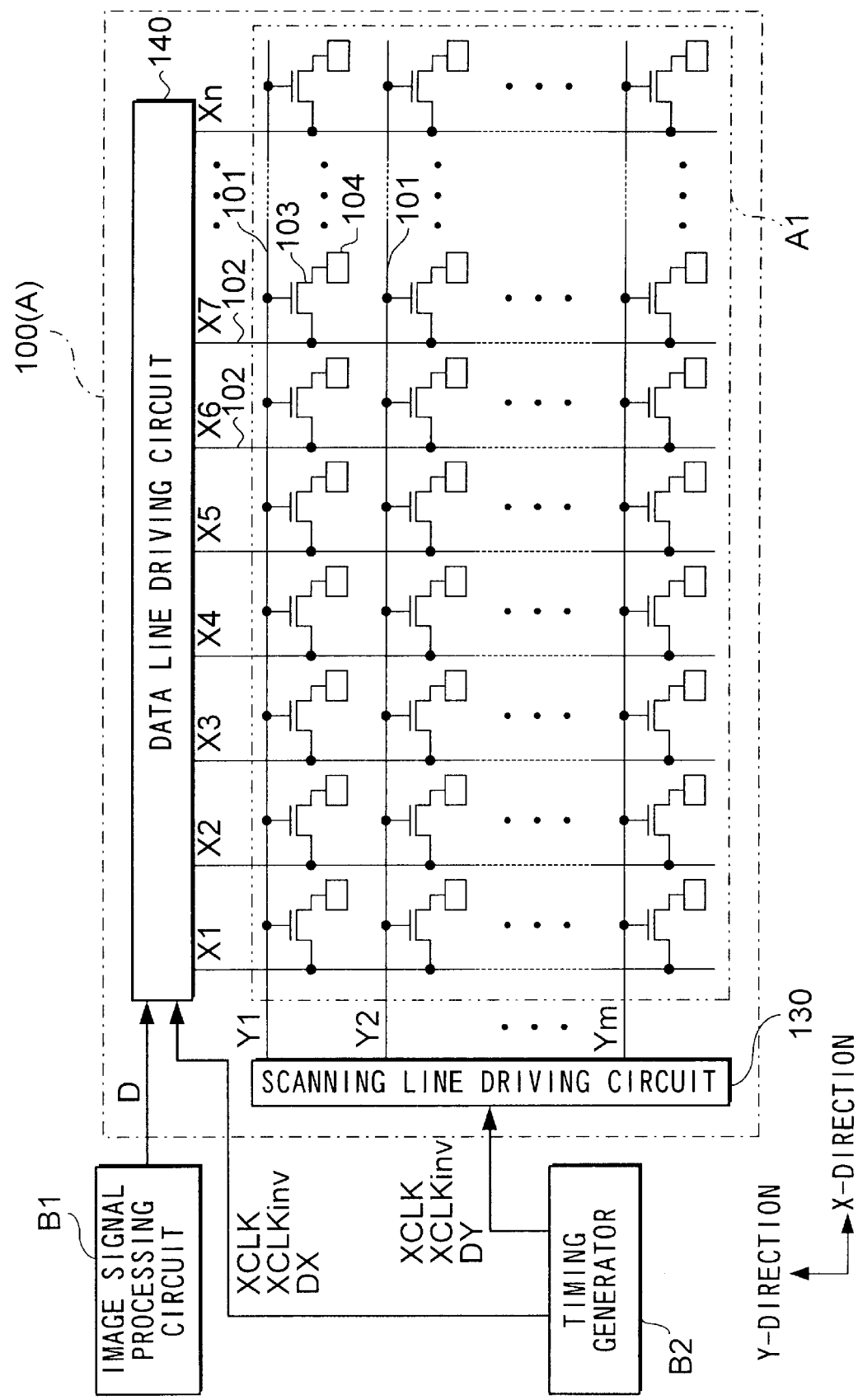
FIG. 3 shows a block diagram of an electrical configuration of an electrophoretic display that uses the panel.

FIG. 3 is a block diagram showing the electrical configuration of the electrophoretic display. As shown therein, the electrophoretic display has the electrophoretic display panel A, described before, and its peripheral circuit including an image processing circuit B1 and a timing generator B2.

In the display area A1 of the electrophoretic display panel A, a plurality of scanning lines 101 are formed in parallel in an X-direction, while a plurality of data lines 102 are formed in parallel in a Y-direction orthogonal to the X-direction. A TFT 103 and a pixel electrode 104 are positioned to provide a pixel in the vicinity of each of the intersections made by these scanning lines 101 and data lines 102. So, the pixels are mapped in a matrix by the intersections made between the scanning lines 101 and data lines 102. The gate electrode of the TFT 103 of each pixel is connected to a certain scanning line 101 for the pixel and a source electrode thereof is connected to a certain data line 102 for the pixel. Moreover, a drain electrode of the TFT is connected with the pixel electrode 104 of the pixel. Each pixel is composed of a certain pixel electrode 104, the common electrode 201 formed on the opposing substrate 102, and the dispersion 1 sandwiched between both electrodes.

The scanning line driving circuit 130 and data line driving circuit 140, which are made using TFTs, are formed by a common production process with the pixel TFTs 103. This way of production is advantageous in integration of elements and in production cost.

The scanning line driving circuit 130 has shift registers and outputs scanning line signals Y1, Y2, . . . , Ym in sequence to each scanning line 101 based on a clock signal YCLK, its inverted clock signal YCLKinv, transfer start pulse DY, and others provided from the timing generator B2.

On the other hand, the data line driving circuit 140 converts image data D supplied from the image signal processing circuit B1 into point-sequence data for driving pixels on the display area A1 pixel by pixel based on a clock signal XCLK, its inverted clock signal XCLKinv, transfer start pulse DX, and others. The driving circuit 140 further A/D-coverts the point-sequence data into data line signals X1, X2, . . . , Xn, which are outputted in sequence to each data line 102.

When a specified scanning signal is brought to its active state and the scanning signal is applied to the TFTs 103 connected to a certain scanning line 101, the data line signals X1, X2, . . . , Xn are sequentially provided to their pixel electrodes 104. This causes an electric field between each pixel electrode 104 and the common electrode 201 on the opposing substrate 200. This results in that electrophoretic particles 3 within the dispersion 1 migrate pixel by pixel to display an image of which gradations are based on image data D.

(1.2 Method of producing electrophoretic display panel)

FIGS. 4A to 4E illustrate a method for producing the electrophoretic display panel according to the first embodiment.

First, in the first process shown in FIG. 4A, the TFTs, pixel electrodes 104, plurality of scanning lines 101, and plurality of data lines 102 are formed on the element substrate 100, in parallel with forming the scanning line driving circuit 130 and data line driving circuit 140 thereon. In this first process, a manufacturing process of TFTs for liquid displays can be used.

Second, in the second process shown in FIG. 4B, the bulkhead 110 are formed on the element substrate 100. There are a variety of methods to form the bulkhead 110. One method for such processes as etching is as follows. On the opposed surface of the element substrate 100 which was subjected to the above first process, a photosensitive polyimide precursor is coated by a desired amount of height, before being dried. A matrix-like mask pattern that corresponds to the divided cells 11C is placed on the precursor, and then ultraviolet is irradiated onto the mask for exposure. After this, the structure is subject to developing and rinse to complete the bulkhead 110.

Then, in third process shown in FIG. 4C, an ink jet type of dispersion charging apparatus is used to fill the dispersion 1 into each divided cell 11C partitioned by the bulkhead 110. The ink jet type of apparatus is capable of accurately charging a minute amount of the dispersion 1 at a higher speed. That is why such apparatus is used in charging the dispersion 1. For example, in the case that one divided cell 11C has dimensions of 240 microns in length, 80 microns in width, and 50 microns in height, its capacity is 960 picolitters. Since the ink jet type of charging apparatus is able to control an ejection amount of less than 6 picolitters, the dispersion 1 can be charged into each divided cell 11C with ease.

Then, in the fourth process shown in FIG. 4D, the upper part of the bulkhead 110 is sealed. In this embodiment, a transparent material which can be fluidized when heated is used as the sealer 202. The sealer 202 is applied to the bulkhead 110, before it is heated for sealing. In this process, when bubbles are once mingled with the divided cells 11C, they are absorbed to the heated sealer 202 or pass though the sealer. If bubbles are mixed with the dispersion 1, it is difficult for the electrophoretic particles 2 to migrate freely, because they are trapped by the bubbles. It is therefore desirable that the divided cells 11C contain as fewer bubbles as possible. In this example, even if bubbles are mingled with the dispersion 1 when it is charged, the bubbles can be expelled out form each divided cell 11C by the heated sealer. The electrophoretic particles 2 can migrate in an ideal state, thus improving quality of images.

Then, in the fifth process shown in FIG. 4E, the opposing substrate 200 on which the common electrode 201 is formed is applied onto the sealer 202 so as to cause the common electrode 201 to be faced to the pixel electrodes 104.

By using the foregoing processes, the electrophoretic display panel A is manufactured.

(1.2.1) First process

The above first process will now be detailed. FIGS. 5A to 5E are illustrations explaining the first process in detail. In this example, N-channel type of TFTs 103 are used in the display area A1, and manufacturing processes of TFTs 103 will now be focused.

Figure 5A:
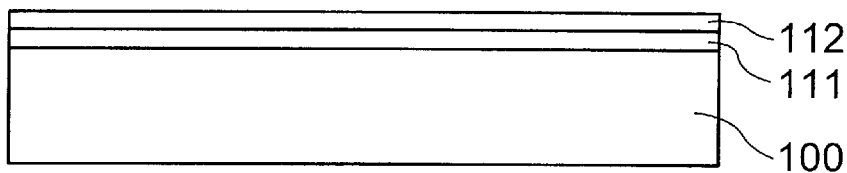
FIGS. 5A to 5E illustrate detailed processes included in a first process of the production method.

As shown in FIG. 5A, an insulating layer 111 is formed on the element substrate 100, then amorphous silicone layer is deposited on the insulating layer 111. An amorphous silicone layer is then recrystallized into the silicone layer by heating it with techniques such as laser annealing, thus crystalline polysilicone layer 112 (of a thickens of 50 nm, for example) being formed.

Figure 5B:
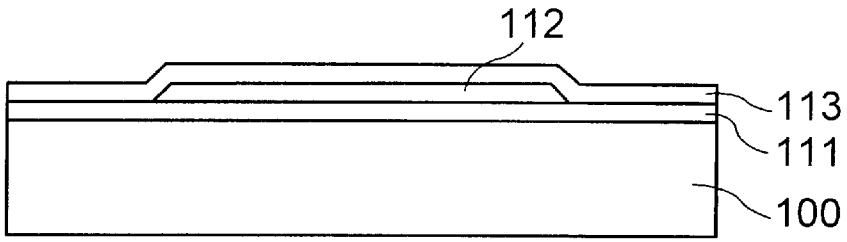

Then, as shown in FIG. 5B, the polysilicone layer 112 is subject to patterning, then a gate insulating layer 113 (of which thickness is 100 to 150 nm) is layered on the patterned polysilicone layer.

Figure 5C:
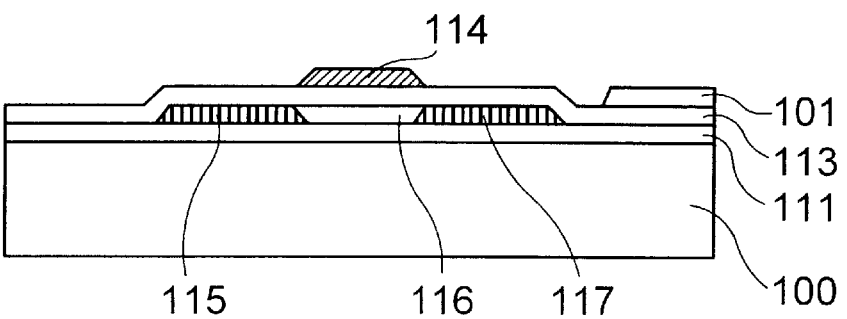

Then, as shown in FIG. 5C, gate electrodes 114 and scanning lines 101 (gate lines) for the TFTs 103 are formed. The gate electrodes and others are formed, for example, in such a manner that patterns including that of the gate electrodes are formed on a resist layer, sputtering or vacuum deposition using metal such as tantalum is performed onto the formed patterns, and the resist is peeled off. Then $PH_3/H_2$ ions are doped to form a source region 115, channel region 116, and drain region 117 of each TFT 103.

Figure 5D:
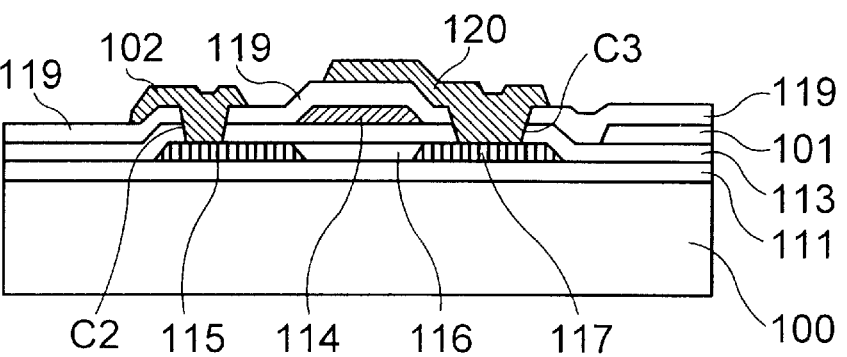

Then, as shown in FIG. 5D, a first layer-to-layer insulator 119 is formed. Contact holes C2 and C3 are opened, the pattern of each electrode is made with patterning of resist, and meal such as aluminum is deposited so that the data line 102 and an aluminum-made electrode 120 are formed.

Figure 5E:
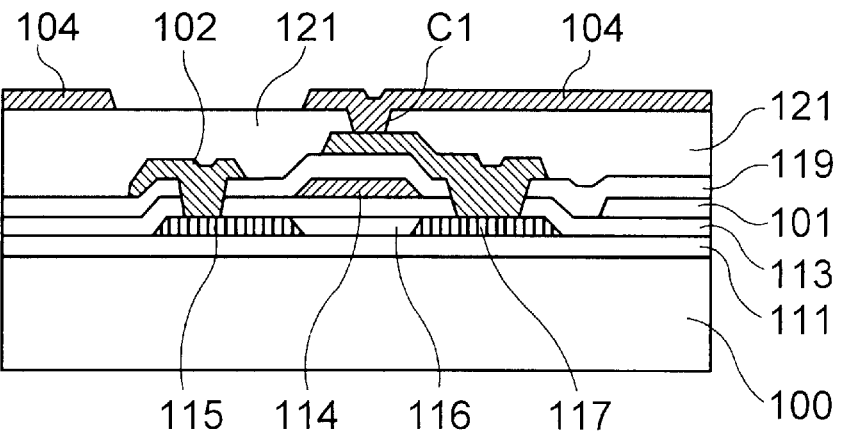

Then, as shown in FIG. 5E, a second layer-to-layer insulator 121 is formed, before a contact hole C1 is opened. And the pattern of each pixel electrode 104 is made with patterning of resist, then deposition is performed with metal such as aluminum so that the pixel electrode 104 is formed.

The above processes produce N-channel TFTs 103 at the display area A1 of the element substrate 100. The scanning line driving circuit 130 and data line driving circuit 140 are designed to be disposed at the peripheral area A2 of the element substrate 100. N-channel TFTs which compose those driving circuits are formed by the foregoing manufacturing processes at the same time. But there is a difference in that those driving circuits use P-channel TFTs. Therefore, actual manufacturing employs a process to form P-channel TFTs between the processes shown in both FIGS. 5C and 5D. In that process, $B_2H_6/H_2$ ions handled as acceptors are doped to form source regions and drain regions of P-channel TFTs.

The element substrate 100 on which TFTs are formed as stated above is sent to the second process, in which the bulkhead 110 is formed on the side on which the pixel electrodes 104 have been disposed. The element substrate 100 is then sent to the third process.

(1.2.2) Third process

Figure 6:
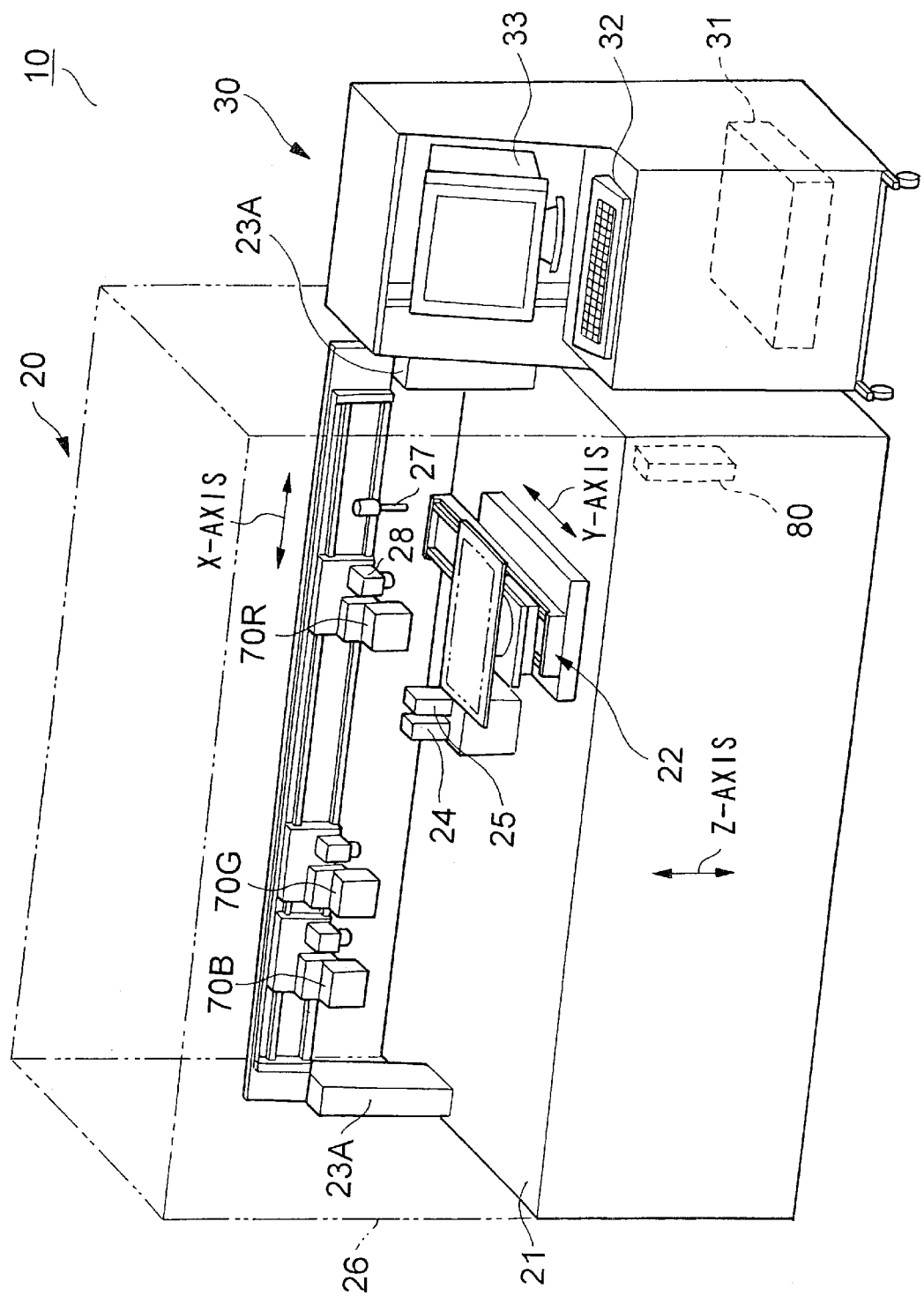
FIG. 6 is a perspective view externally showing dispersion charging apparatus used in a third process of the production method.

FIG. 6 is a perspective view showing an external view of the dispersion charging apparatus used in the third process. As shown therein, the dispersion charging apparatus 10 has an apparatus main frame 20 and a controller 30 controlling each component of the apparatus main frame. The controller 30 is provided with a computer 31, a keyboard 32 by which operator's instructions are entered, and monitor 33 that displays progress states of the process operation and others.

The apparatus main frame 20 is provided with a base 21, first conveyer 22, second conveyer 23, ink jet units 70R, 70G, and 70B, capping unit 24, cleaning unit 25, and others. Each of the ink jet units 70R, 70G, and 70B is used for ejecting the dispersion 1 corresponding to each of the RGB colors into the divided cells 11C. This dispersion charging apparatus 10 operates the units 70R, 70G, and 70B in turn so that the dispersion 1 is charged, color by color, into a specified divided cell 11C.

The base 21 is covered at its upper side by a safety cover 26 so as to contain the constituents that are in charge of charging the dispersion 1. An operator can open a door of the safety cover 26 to make access to such constituents. Within the base 21 is provided a control panel 80 responsible for transmitting and receiving control signals to and from the controller 30.

The first conveyer 22 is arranged on the base 21 for conveying the element substrate 100 along the Y-axis direction. The second conveyer 23 is secured vertically to the base 21 using pillars 23A. The second conveyer 23 conveys the ink jet units 70R, 70G, and 70B along the X-axis directed in a lateral direction, which is orthogonal with the Y-axis along which the first conveyer conveys the element substrate 100.

Figure 7:
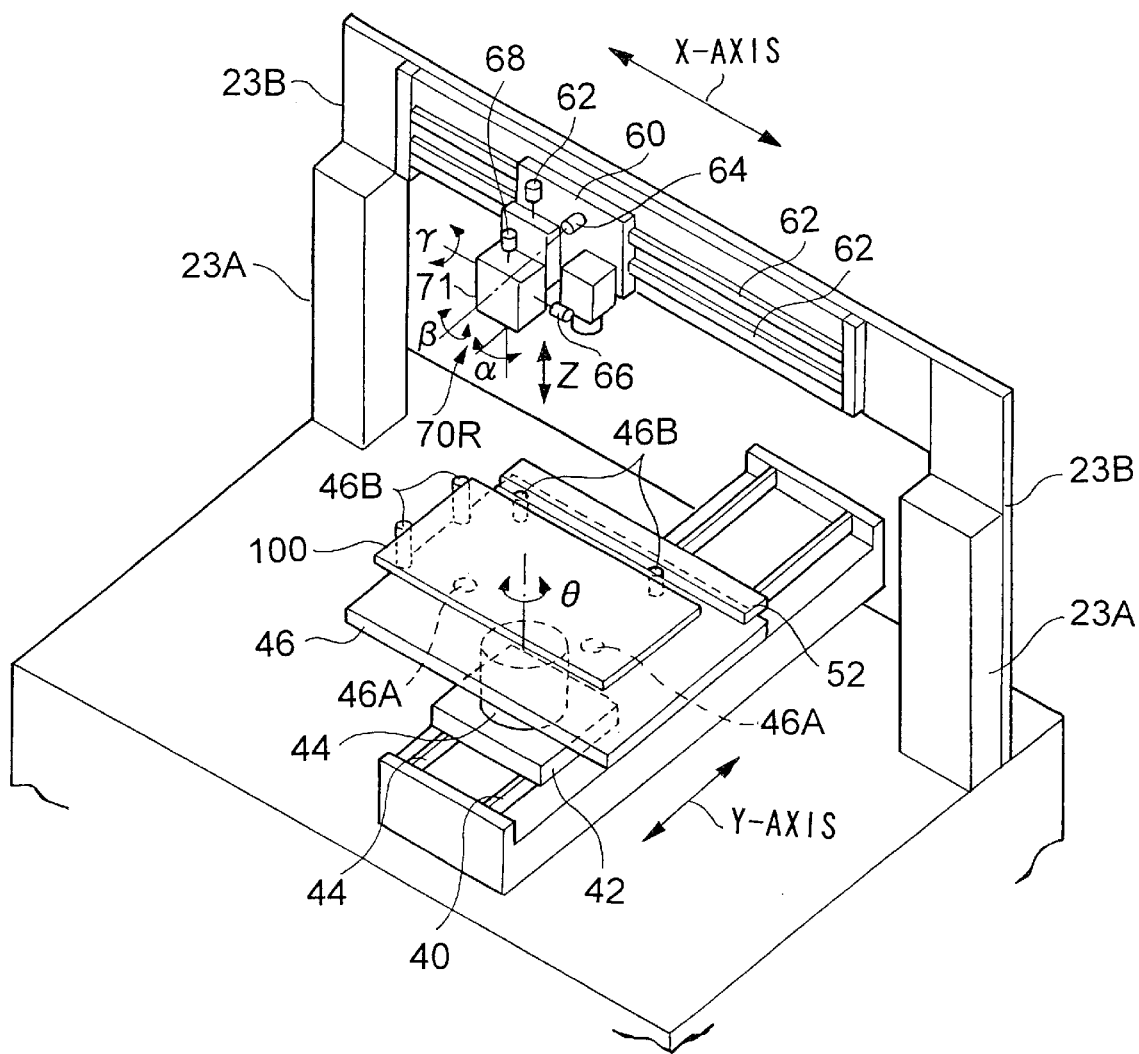
FIG. 7 is an enlarged perspective view of the dispersion charging apparatus.

Referring to FIG. 7, the first and second conveyers 22 and 23 will now be detailed. FIG. 7 representatively shows only one ink jet unit 70R, with the remaining ink jet units 70G and 70B omitted from the drawing. As illustrated, the first conveyer 22 includes a slider 42, guide rails 40, and a table 46. The slider 42 contains a linear motor to move along the guide rails 40 in the Y-axis direction. The slider 42 has a θ-axis motor 44. This motor 44 is composed of a diject drive motor, for example, and its rotor is secured to the table 46. Thus, powering the motor 44 allows the rotor and table 46 to rotate along a θ-direction to index the table 46 (rotational dividing).

The table 46 has an absorption sustaining means or unit (not shown). When being put into operation, the absorption sustaining unit absorbs the element substrate 100 and sustains it on the table 46 through a hole 46A of the table 46. The table 46 has positioning pins 46B which allow the element substrate 100 to be positioned on the table 46 with precision.

In addition, the table 46 has a dummy shot area 52 toward which the ink jet head unit 70R can shot ink as dummy shots or trial shots. The dummy shot area 52 is parallel with the X-axis direction and located at the rear end side.

The second conveyer 23 comprises columns 23B fixed to the pillars 23A, a slider 60, and guide rails 62. The slider 60 contains a linear motor and can be positioned by moving along the guide rails 62 in the X-axis direction. An ink jet unit 70R is secured to the slider 60.

The ink jet unit 70R has an ink jet head 71 and motors 62, 64, 66 and 68 functioning as swing positioning means. The ink jet head 71 can be moved up-and-down (along the Z-axis) by the motor 62. The Z-axis is assigned to a direction (vertical direction) orthogonal to both X- and Y-axes. The motors 64, 66 and 68 are responsible for swinging the ink jet head 71 in β-, γ- and α-directions so that the head is positioned in those directions.

Thus, the ink jet head 71, which is secured on the slider, can be positioned as it moves linearly in the Z-axis direction, and can be positioned as it swings in each of the β-, γ- and α-directions. It is therefore possible to control position and/or attitude of the ink jet head 71 so that its ink-ejecting surface, from which an ink droplet is ejected, faces with precision the element substrate 100 placed on the table 46. The other ink jet units 20G and 20B are configured in a similar manner to the above ink jet unit 20R.

Referring to FIG. 8A, the configuration of the ink jet head 71 will be exemplified. The ink jet head 71 uses, for example, a piezoelectric element and has an ink-ejecting surface 71P in which a plurality of nozzles 71 are formed, as shown in FIG. 8A. A piezoelectric element 73 is disposed for each of the nozzles 72.

As shown in FIG. 8B, each piezoelectric element 73 is mounted with a combination of each nozzle 2 and each ink chamber 74. To the ink chamber 74, the dispersion 1 is supplied as ink. Applying an voltage Vh shown in FIG. 8C to each piezoelectric element 73 will cause the piezoelectric element 73 to expand and contract in an arrow-showing Q direction, as pictorially shown in FIGS. 8D to 8E Those motions of the piezoelectric element 73 bring about a pressure in the dispersion 1, with the result that a desired amount of ink 75 (droplet) is ejected from the nozzle 72.

Then, the capping unit 24 illustrated in FIG. 6 covers the ink-ejecting surface 71P with a cap during it waits for the next ejecting operation, so as not to dry the ink-ejecting surface 71P. The cleaning unit 25 can clean the nozzles 72 and others of the ink jet head 71 at regular intervals or at arbitrary timings during the head ejects the dispersion or waits for the next ejecting operation. An alignment camera 27, which is provided as shown in FIG. 6, detects an alignment mark previously put on the element substrate 100 to sense a position of the substrate 100.

FIG. 9 shows the electrical configuration of the dispersion charging apparatus 10. In this figure, the ink jet unit 70R is shown as to its electrical configuration, with that of the other ink jet units 70G and 70B omitted.

The computer 31, which controls the entire apparatus, provides both of the first conveyer 22 (including a linear motor) and θ-axis motor 44 with control signals via a control panel 80. This enables the element substrate 100 to be positioned in both of the Y-axis and θ-axis directions. Concurrently, the computer 31 provides control signals to both second conveyer 23 (including a linear motor) and motors 62, 64, 66 and 68 of the ink jet unit 70R. Thus, the ink jet head 71 is positioned.

Further there is provided a dispersion supply 81 for supplying the ink jet head 71 with the dispersion 1. The dispersion supply 81 is connected with both of a thermometer 82 and a viscosity meter 83. Information in relation to temperatures and viscosity amounts measured by those devices are sent to a dispersion management controller 84 in the form of feedback signals S1 and S2.

Based on the feedback signals S1 and S2, the dispersion management controller 84 gives the computer 31 information about the temperature and viscosity of the dispersion 1 as control information. The computer 31 sends out, via the control panel 80, a piezoelectric element driving signal S3 to a piezoelectric element driving circuit 85. The piezoelectric element driving circuit 85 applies a voltage Vh to the piezoelectric element 73 according to the piezoelectric driving signal S3, the voltage Vh being in agreement with a current temperature and viscosity of the ink. Such configuration makes it possible to eject a desired amount of ink droplet 75 controlled according to the temperature and viscosity of the dispersion 1.

Figure 10:
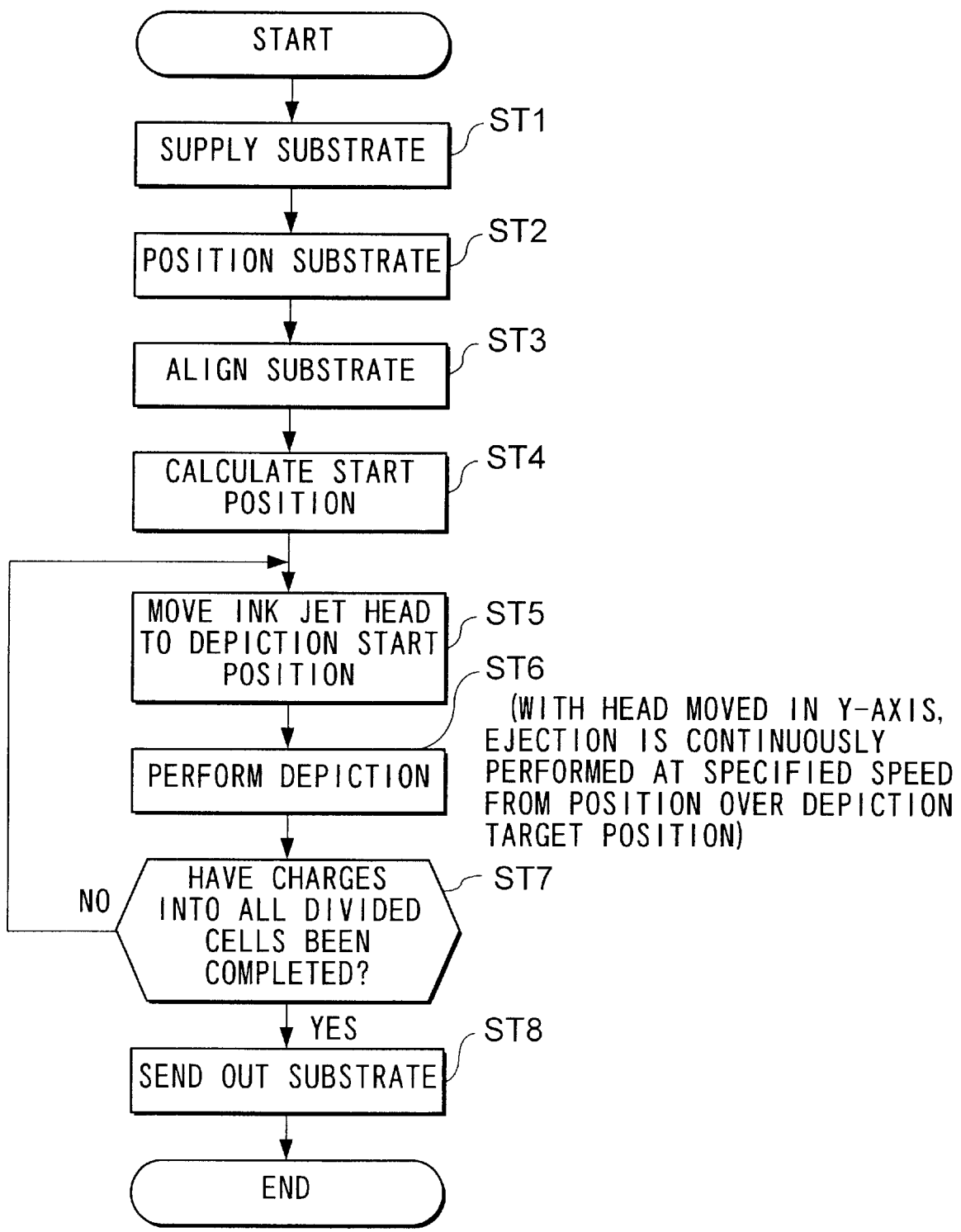
FIG. 10 is a flowchart exemplifying an operation of the dispersion charging apparatus.
Figure 11:
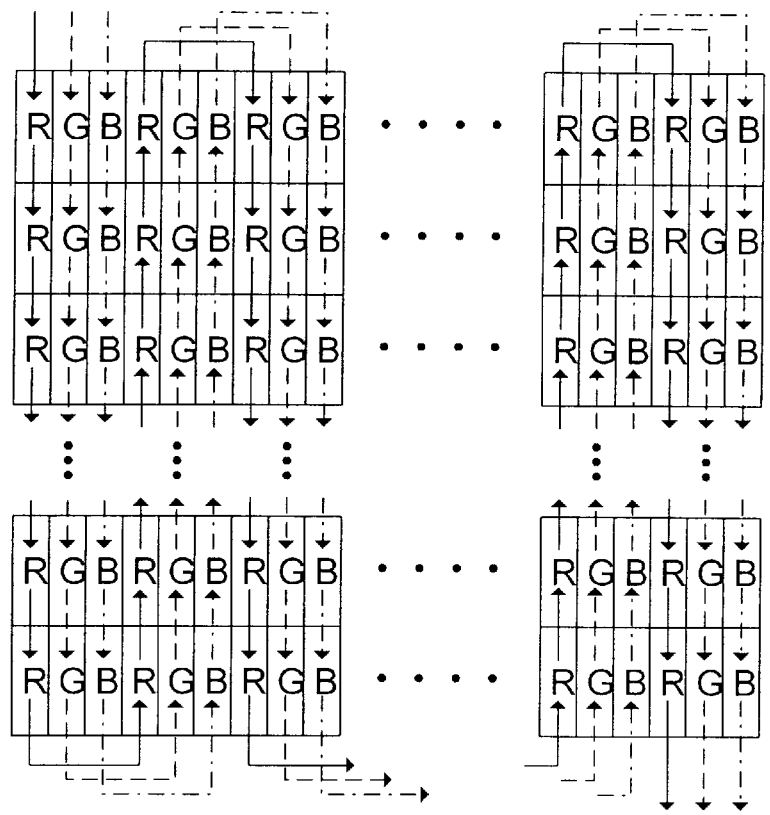
FIG. 11 illustrates a charging operation of the dispersion carried out by the dispersion charging apparatus.

Referring to FIG. 10, an operation of the dispersion charging apparatus will now be exemplified. First, when the computer 31 sends a substrate supplying command to substrate supplying/sending means (not illustrated), an element substrate 100 is supplied onto the table 46 of the first conveyer 22 (Step ST1). This element substrate 100 is made to come in contact with the positioning pins 46B shown in FIG. 7, thereby being positioned over the table 46 (Step ST2). Then the motor 44 is started to rotate so as to make an end of the element substrate 100 parallel with the Y-axis direction. Hence the alignment of the substrate has been completed.

After this, the computer 31 calculates a start position at which the dispersion 1 is started to be ejected, based on information provided by the alignment camera 27, an observation camera 28, and others (Step ST4). The computer 31 then sends, through the control panel 80, control signals to both of the first and second conveyers 22 and 23 to move the inkjet head 71 to a depiction start position (Step ST5).

Then at Step ST6, the computer 31 examines a state of the dispersion from signals coming from the dispersion management controller 84, which are processed from the feedback signals S1 and S2 indicative of states of the dispersion 1. Based on this examined result, the computer 31 generates a piezoelectric element driving signal S3. This signal S3 is then amplified by the piezoelectric driving circuit 85 and supplied to the piezoelectric element 73. This controls an amount of ejection of the dispersion 1. To be specific, one control technique is to alter voltage to be applied to the piezoelectric element. An amount of distortion of the piezoelectric element is therefore controlled, thus amounts of the ejection being adjusted. Another control technique is to change the frequency of applied voltage, which controls a speed in distortion of the piezoelectric element. As a result, the amount of ejection is balanced with a load force caused due to the viscosity of the dispersion.

In the ejecting process, the computer 31 makes the ink jet unit 70R to charger the R color dispersion into the divided cells along paths shown by solid lines in the figure. Specifically, the first conveyer 22 is operated so that the divided cells residing in the first column are charged, then the second conveyer 23 is operated so that the divided cells residing in the fourth column are charged. Thereafter, the columns of which divided cells are charged are shifted every time by three lines in the lateral direction, and such a charging operation is repeated. Therefore, all of the divided cells 11C for the R color are charged with the dispersion 1. After this, the ink jet units 70G and 70B are used for charging the divided cells for the G an B colors, respectively.

Then, according to a pre-given control program, the computer 31 determines whether all of the divided cells 11C have been charged with the dispersion 1 (Step ST7). If the determination is that charging all of the divided cells has not been completed yet, the processing is made to return to Step ST5 so as to repeat the positioning and the ejection of the dispersion. Namely, ejecting the dispersion and moving the substrate (i.e., column-to-column moves) are repeated in an alternating mode, so that the dispersion 1 will be charged into each divided cell 11C in turn. When the charge of the dispersion 1 has been completed, the processing is made to proceed to Step ST8 to send out the element substrate 100.

As described above, the third process uses the ink jet type of dispersion charging apparatus 10, which makes it possible that the dispersion 1 is charged into each divided cell 11C in a precise and speedy fashion. In this embodiment, the ink jet head 71 has been exemplified using the piezoelectric element 73. But any way of moving may be applied to the ink jet head. For example, a bubble jet type of head in which the dispersion 1 is jetted by heating or an electrostatic type of head making use of a Coulomb's force is also available to the charging.

Furthermore, this embodiment has used additive-color-processed R, G and B colors as the dispersion 1, but may also use subtractive-color-processed C, M and Y colors. Further, the stripe type of color arrangement has been exemplified, but it is also possible to employ a mosaic type or other types. In addition, white pigment particles (for example, titanium oxide) may be used as the electrophoretic particles 3 and a black-dyed medium may be used as a dispersion medium 2, thus providing a black-and-white display manner.

(1.3) Modifications of first embodiment

Modifications of the first embodiment will now be explained.

(1.3.1) Modification of second process (part 1)

Figure 12:
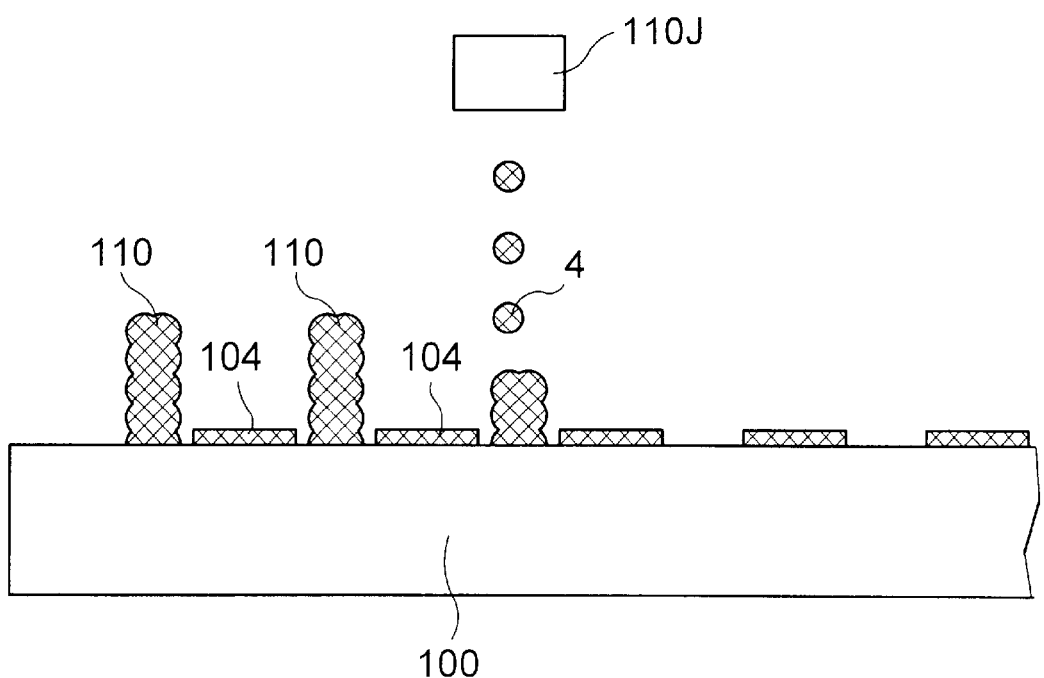
FIG. 12 illustrates a process to form a bulkhead using an ink jet unit.

In the foregoing first embodiment, the bulkhead 110 has been formed using etching or others, but this bulkhead 110 may be produced with an ink jet apparatus similar in construction to the desperation charging apparatus 10 used for charging the dispersion 1. For example, an ink jet unit 110J capable of ejecting the bulkhead material 4 may be added to the dispersion charging apparatus 10 shown in FIG. 6 and controlled in a similar manner to the ink jet units 70R, 70G and 70B described before. FIG. 12 illustrates a step to form the bulkhead 110 using such ink jet unit 110J. As shown therein, the unit 110J ejects the bulkhead material 4 repeatedly such that it is gradually deposited on the element substrate 100, then the deposited material 4 is hardened to form the bulkhead 110.

Usable as the bulkhead material 4 are materials which can be processed by UV hardening, heat hardening, condensation hardening, addition polymerization hardening, or others. Further, as for a step to form the bulkhead 110, hardening may be made at intervals in the course of deposition of the material, so that deposition and hardening are repeated alternately.

(1.3.3) Modification of second step (part 2)

Although the common electrode 201 is placed on the opposing substrate 200 in the foregoing first embodiment, the function of the common electrode 201 may be given to the bulkhead 110. By way of example, resin in which a conductive material (carbon or metallic fiber) is kneaded and contained can be used as the material of the bulkhead 110, so that the entire bulkhead 110 has conductivity. Therefore, it is possible that the bulkhead 110 itself is used as the common electrode.

Figure 13A:
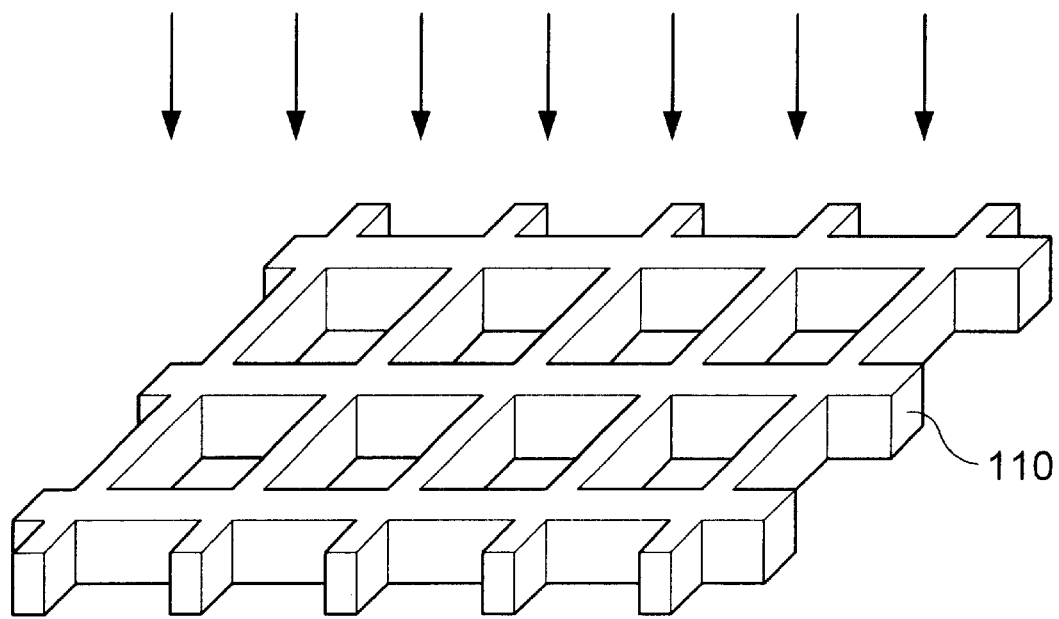
FIGS. 13A and 13B are illustrations to explain processing of providing part of the bulkhead with conductivity.
Figure 13B:
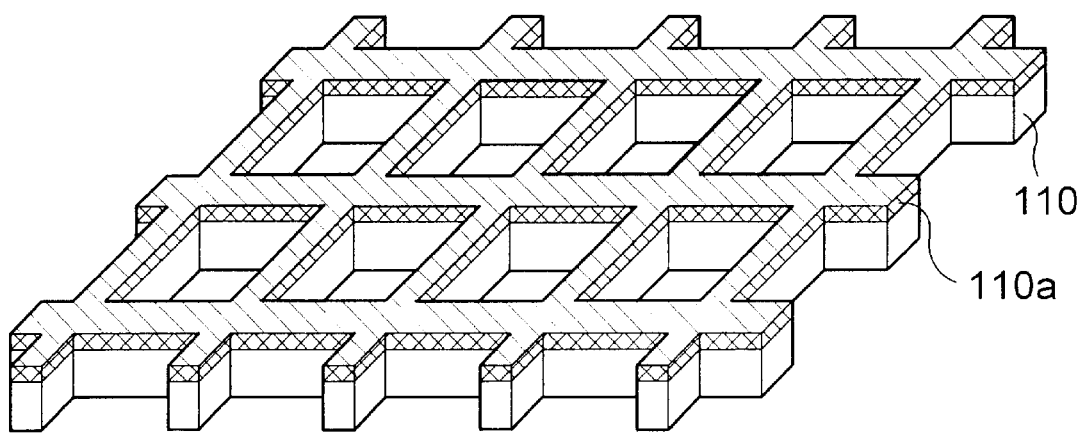

Alternatively, the bulkhead 110 can be first produced with an insulating material, then it can be subjected to deposition of a metal material or processing based on a CVD technique (vapor phase epitaxy technique) so as to have conductivity. In this case, the conductivity is not given to the whole bulkhead 110, but may be given partly to the surface of the bulkhead, which faces the opposing substrate 200. For example, as shown in FIG. 13A, doping ions into the bulkhead 110 permits an upper part 110a of the bulkhead 110 to have conductivity dependently on an amount of doping, as shown by an hatched portion in FIG. 13B.

Figure 14:
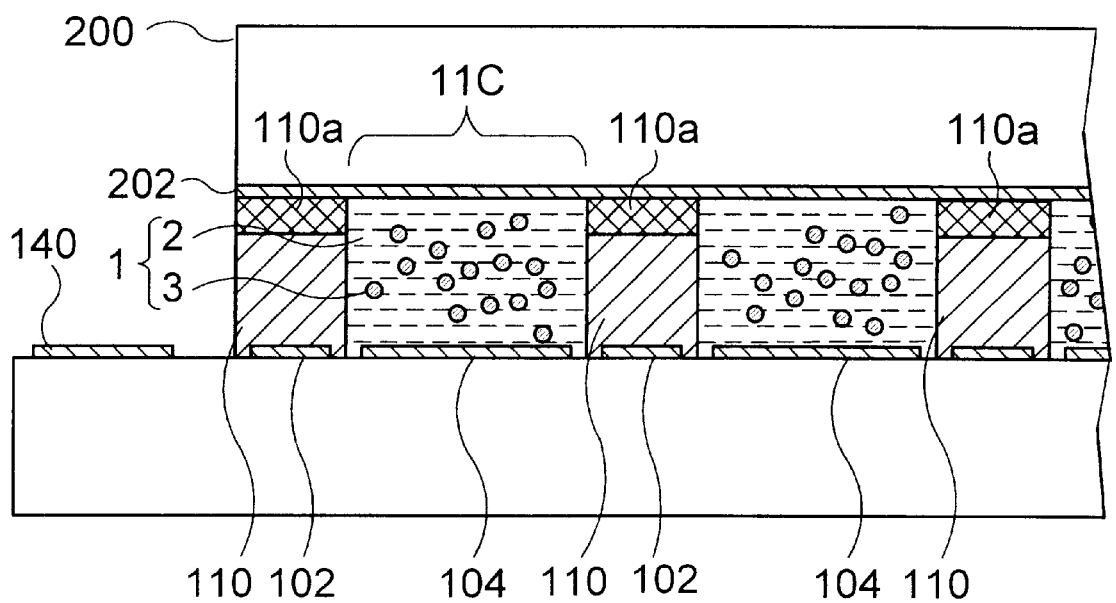
FIG. 14 is a partially shown sectional view of an electrophoretic display panel whose bulkhead has conductivity in part.

FIG. 14 is a sectional view of the electrophoretic display panel A manufactured in this way. As shown therein, the common electrode 201 is not provided on the lower side of the opposing substrate 200, but conductivity is given to an upper part 110a of the bulkhead 110. Thus the part 110a can also be used as a common electrode. It is therefore possible to make the whole electrophoretic display panel A thinner by an amount of thickness of the common electrode 201, in addition to less weight. Because the distance between both electrodes becomes smaller, there is the advantage that even lower drive voltage is enough to generate a high-strength electric field.

(1.3.3) Modifications of second process (part 3)

The foregoing material of the bulkhead 110 may be replaced by a material with which such an additive as black pigment particles, chrome, or carbon is mixed. By this material, the bulkhead 110 is able to have the function of a black matrix.

To improve resolution and vividness of colors, color-display cathode-ray tubes or color-display liquid crystal display panels have a configuration in which color filters corresponding to pixels and a black matrix surrounding the color filters with a black frame are arranged integrally. It is apparently true that since the electrophoretic display represents, as a display color, a color of the dispersion medium 2 itself or electrophoretic particles 3 themselves, the color filters are unnecessary. However, if improvement in resolution and vividness of colors are desired, it is preferable to use the back matrix. In such a case, though it is conceivable to dispose the black matrix on the opposing substrate 200 with the back matrix made to correspond to each divided cell (pixel), the processes to manufacture the opposing substrate 200 increase. So in the case that the bulkhead 110 is made into black one, it becomes possible to use the bulkhead 110 in common with the black matrix and there is no need for separately arranging a black matrix on the opposing substrate 200. This simplifies the construction and improves quality of displayed images.

(1.3.4) Modification of Fourth process (part 1)

In the foregoing embodiment, the electrophoretic display panel A has been manufactured such that the bulkhead 110 is first sealed with the sealer 202, then the opposing substrate 200, on which the common electrode 201 is formed, is applied to the element substrate 100. However, the sealer 202 and common electrode 201 may be used in common. By way of example, resin in which a conductive material (carbon or metal fabric) is kneaded and contained can be employed as the sealer 202. Alternatively, the sealer 202 is made with an insulating material, then conductivity is given to the upper surface of the sealer, after the sealing is made with the sealer, by ion doping, deposition of metal material, or application of the CVD technique (vapor phase epitaxy technique).

Figure 15:
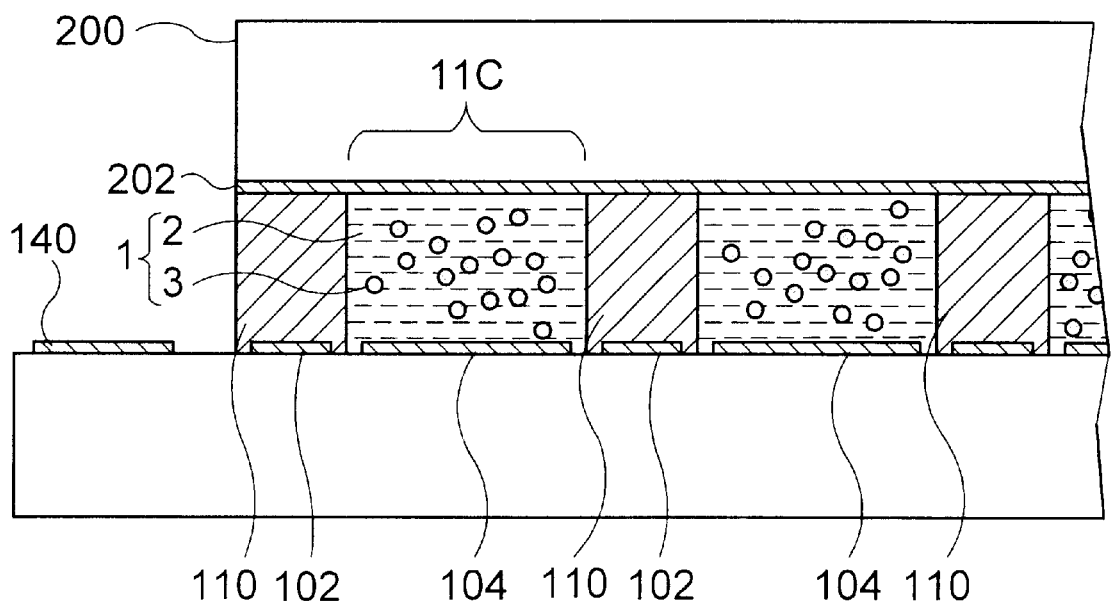
FIG. 15 is a partially shown sectional view of an electrophoretic display panel whose sealer has conductivity.

FIG. 15 shows a section of the electrophoretic display panel A produced in such a way. As shown therein, the common electrode 201 is not provided on the lower side of the opposing substrate 200, but conductivity is given to the sealer 202. Thus the sealer 202 itself can be used as a common electrode as well. It is therefore possible to make the whole electrophoretic display panel A thinner by an amount of thickness of the common electrode 201, in addition to less weight.

(2) Second embodiment

Referring to drawings, an electrophoretic display according to a second embodiment will now be described.

(2.1) Outline of electrophoretic display

Figure 16:
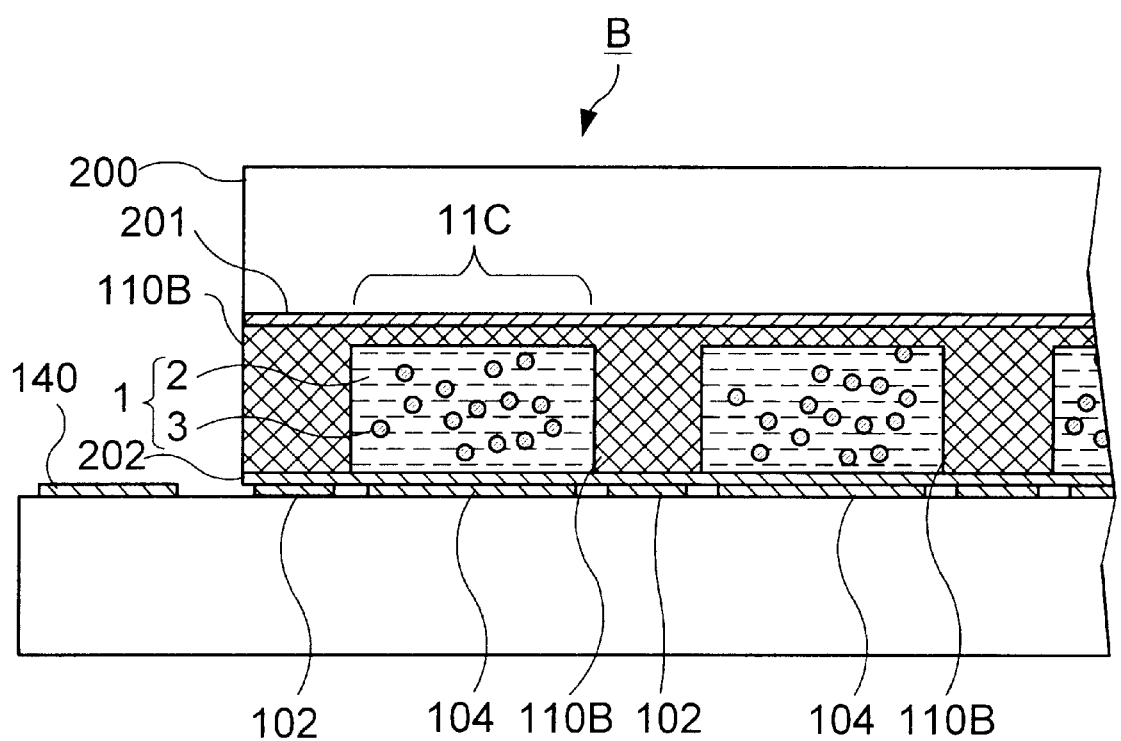
FIG. 16 is a partially shown sectional view of an electrophoretic display panel according to a second embodiment of the present invention.

An electrophoretic display according to the second embodiment is produced, as to its entire configuration, in a similar manner to the first embodiment shown in FIGS. 2, except its detailed mechanical configurations. FIG. 16 is a sectional view of an electrophoretic display panel B according to the second embodiment. This panel B is configured in a similar manner to the electrophoretic display panel A of the first embodiment shown in FIG. 2, except that a bulkhead 110B is used for the bulkhead 110 and the sealer 202 is disposed on the lower surface of the bulkhead 110B. Such differences result from the fact the production methods of the bulkheads are different from each other between the first and second embodiments.

(2.2) Production method of electrophoretic display panel

Refereeing to drawings, a production method of the electrophoretic display panel B will now be described. FIG. 17 illustrates the production method of the panel B.

Figure 17A:
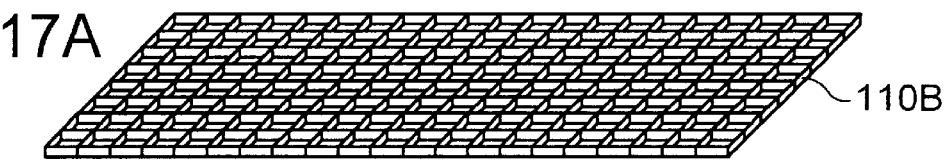
FIGS. 17A to 17E illustrate a production method of the panel.
Figure 18:
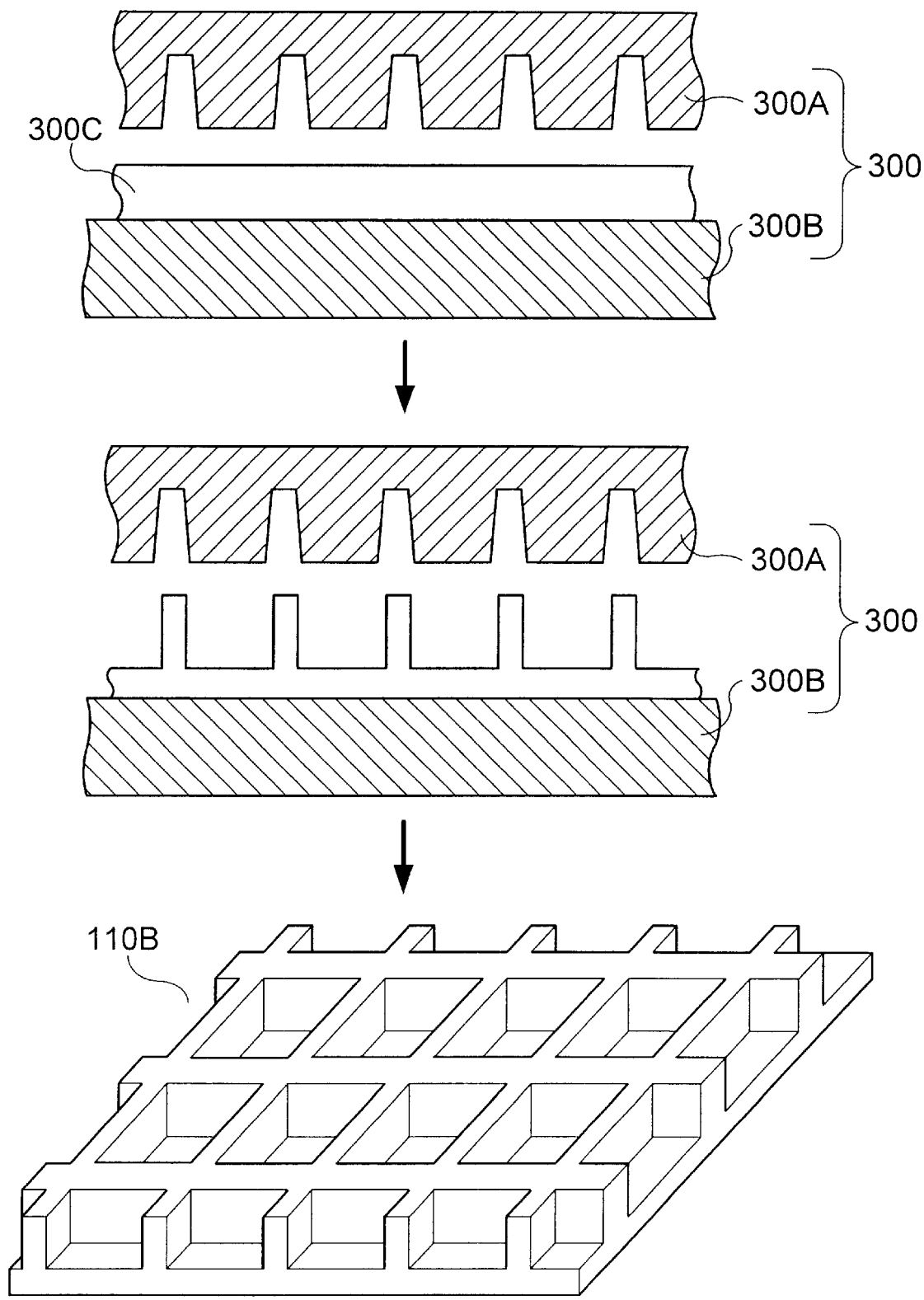
FIG. 18 illustrates in detail a first process of the production method.

First, in the first process shown in FIG. 17A, a bulkhead 110B is produced with a stamper. FIG. 18 details the first step. The stamper 300 is provided with a recessed type of mold 300A corresponding in shape to the bulkhead 110B and a base 300B. Between mold 300A and base 300B, a sheet-like transparent bulkhead material 300C is placed. The mold 300A is moved downward to press the bulk material 300C, thereby forming the bulkhead 110B. This bulkhead 110B has box-bottomed partitions arranged in a matrix, each partition corresponding to each divided cell 11C. This bulkhead 110B is different from the bulkhead 100 used in the first embodiment in that the bulkhead 100 has partitions with no bottoms. Forming such minute irregularities on a sheet-like material using a stamper can be realized by adopting a technique of producing CD-ROMs.

Figure 17B:
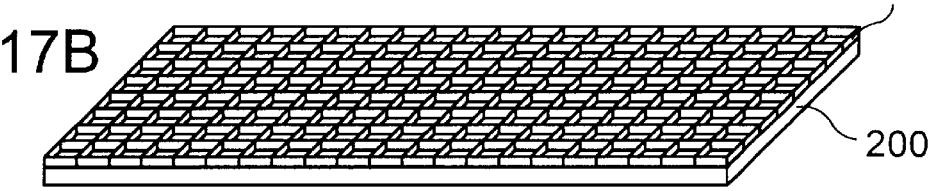

In the second process shown in FIG. 17B, both of the bulkhead 110B and the opposing substrate 200 on which the common electrode 201 are applied to each other in such a manner that the bottom of the bulkhead 110B faces the common electrode 201.

Figure 17C:
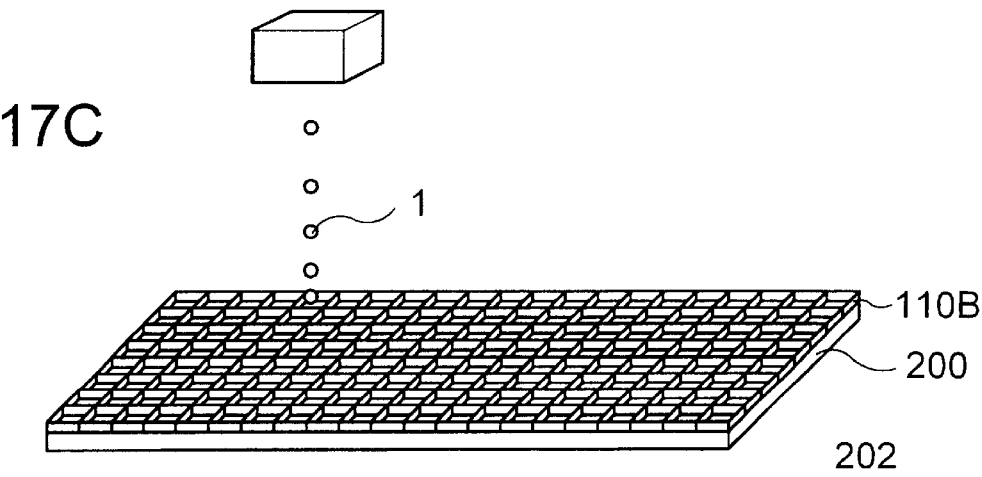

In the third process shown in FIG. 17C, the ink jet type of dispersion charging apparatus 10 is used to charge the dispersion 1 into each divided cell 11C partitioned by the bulkhead 110B. Except that the opposing substrate 200 is used instead of the element substrate 100, the third step is identical to that used in the first embodiment.

Figure 17D:
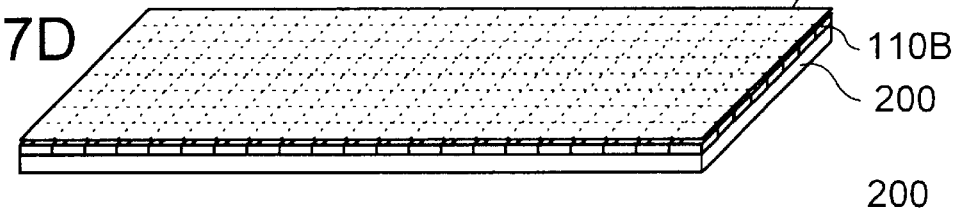

In the fourth process shown in FIG. 17D, the other end surface of the bulkhead 110B, which is opposite to the bottom, is sealed with the sealer 202.

Figure 17E:
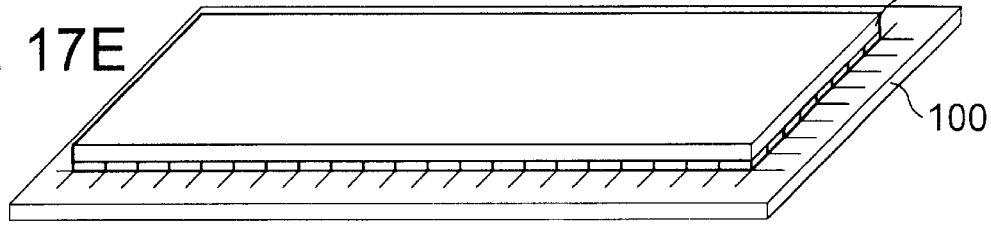

In the fifth process shown in FIG. 17E, the element substrate 100 on which such elements as TFTs and driving circuits are formed in its display area A1 and peripheral area A2 is applied to the opposing substrate 100 produced in the fourth process, so that the electrophoretic display panel B has been produced. The element substrate 100 on which elements including TFTs formed is prepared in advance through the production processes described already in the first process of the first embodiment.

The production method stated above uses the stamper 300, hence it is able to mass-produce the bulkhead 110B with a great precision. In consequence, a largely-lowered price can be set to the electrophoretic display panel B.

(2.3) Modifications of second embodiment

Modifications of the second embodiment will now be described.

(2.3.1) Modification of first step (part 1)

In the second embodiment, the common electrode 201 was previously formed on the opposing substrate 200, then the opposing substrate was applied to the bulkhead 110B. Alternatively, a common electrode can be formed within the bulkhead 110B.

Figure 19:
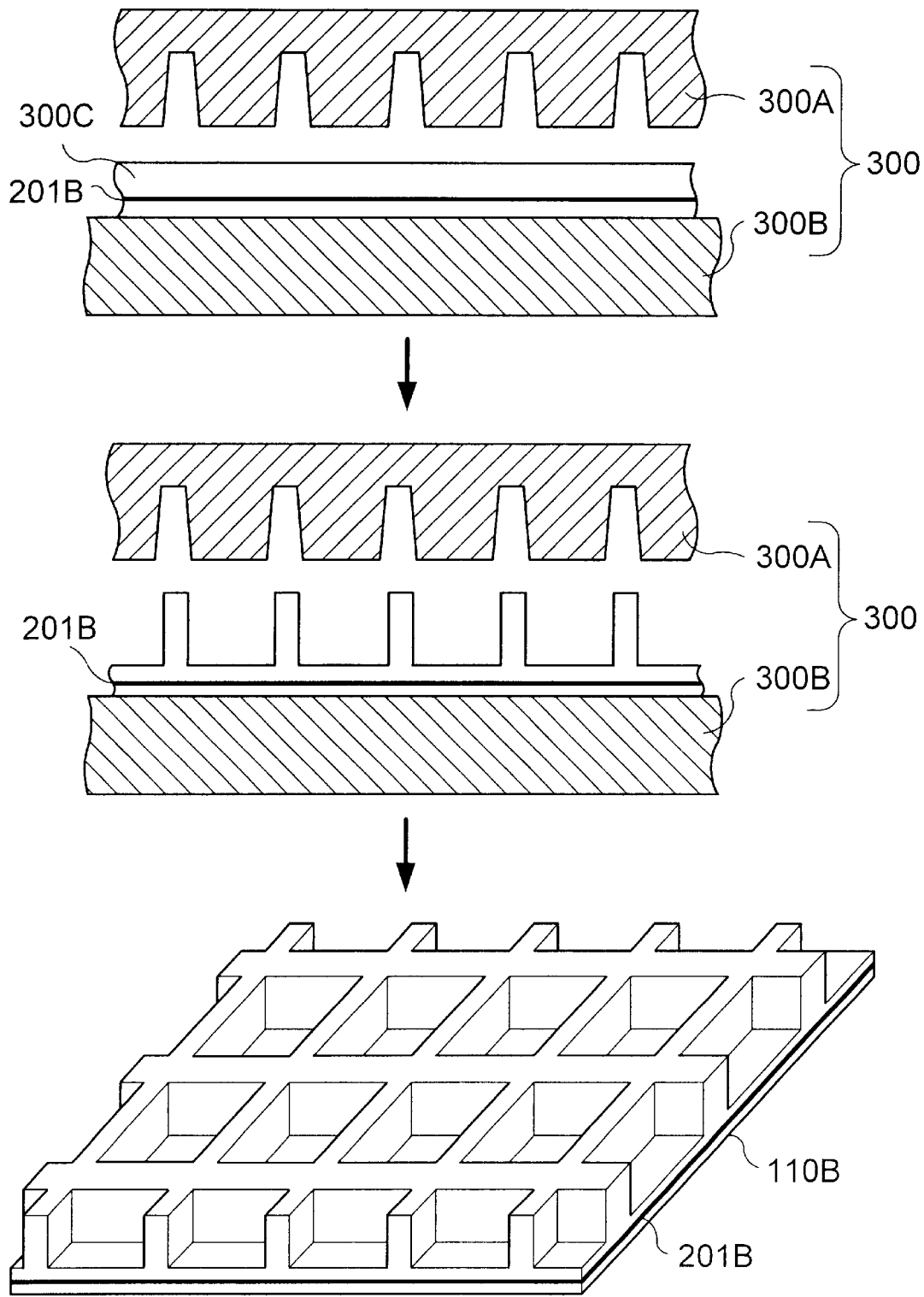
FIG. 19 illustrates a production process of a bulkhead within which a common electrode is incorporated.

FIG. 19 illustrates processes of producing the bulkhead 110B containing the common electrode. In this example, the foregoing stamper 300 is pushed down to a bulkhead material 300C in which a transparent electrode (made of conductive material) is inserted between two sheets. The transparent electrode provides the common electrode 201B. The common electrode 201B is positioned in its thickness direction in such a manner that the common electrode 201B does not tear up the sheet materials and is not exposed, when the mold 300A presses the bulkhead material 301C. Thus, it can be avoided that, when irregularities serving as the divided cells are formed on the bulkhead material 301C by the stamper, the common electrode 201B is damaged by the mold 300A due to their direct contacts.

Applying the thus-produced bulkhead 110B to the opposing substrate 200 results in that processes required for forming the common electrode 201 on the opposing substrate 200 can be omitted. This makes it possible to lower a manufacturing cost of the electrophoretic display panel B.

(2.3.2) Modification of first process (part 2)

In the second embodiment, the common electrode 201 is disposed on the opposing substrate 200. Instead, an alternative configuration may be done such that functions of the common electrode 201 are given to the bulkhead 110B. For example, as a material of the bulkhead 110B, a resin in which a conductive element (carbon or metallic fiber) is contained in a kneaded manner can be used. This gives conductivity to the whole bulkhead 110B, and makes it possible to use the bulkhead 110B itself as a common electrode.

An alternative is that the bulkhead 110B is first formed of resin with no conductivity, then conductivity is given to a surface of the bulkhead through a technique of ion doping or CVD (vapor phase epitaxy). Another alternative is that the bulkhead 110B is first formed of resin with no conductivity, then conductivity is given to a surface of the bulkhead by coating the surface with a conductive material.

Figure 20:
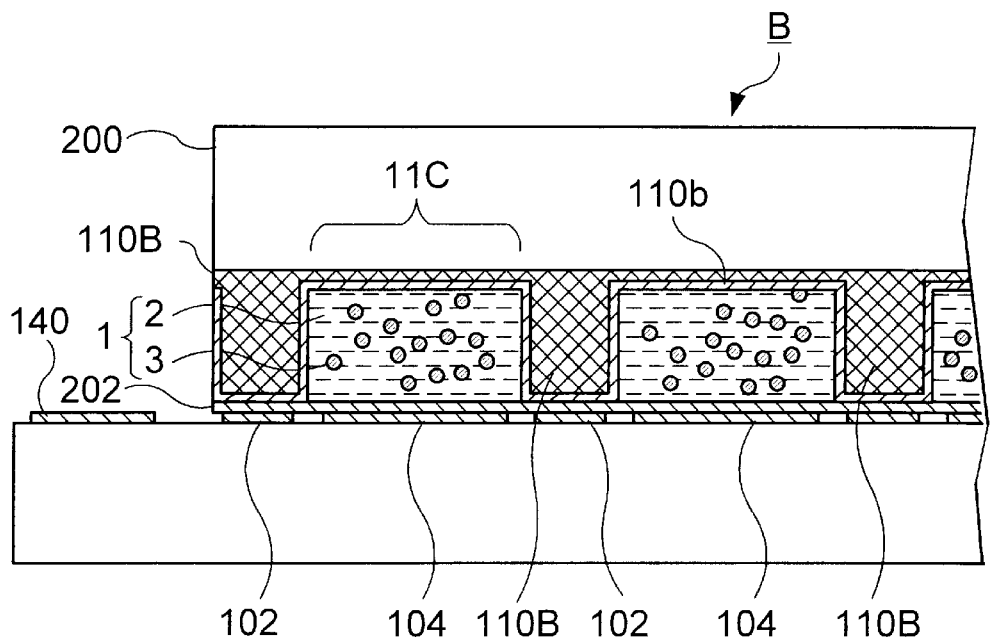
FIG. 20 is a partially shown sectional view of an electrophoretic display panel whose bulkhead has conductivity on its surface.

FIG. 20 is a sectional view of the electrophoretic display panel B manufactured in such a way. As shown therein, though a common electrode is not placed on the lower surface of the opposing substrate 200, the upper surface 110b of the bulkhead 110B has conductivity instead. So this upper surface 110b is able to serve as a common electrode. It is therefore possible that the panel B is made thinner, as a whole, by an amount of thickness of the common electrode 201 used before, in addition to less weight. Further, both electrodes becomes shorter in distance, which is advantageous in that a lower drive voltage generates a higher electric field.

(3) Applications

The embodiments of the present invention have been described, but the present invention is not limited to modes shown by those embodiments. Without departing from the scope of the present invention, more applications and modifications are available, some of which will now be representatively explained below.

(3.1) Passive matrix type of electrophoretic display panel

Figure 21:
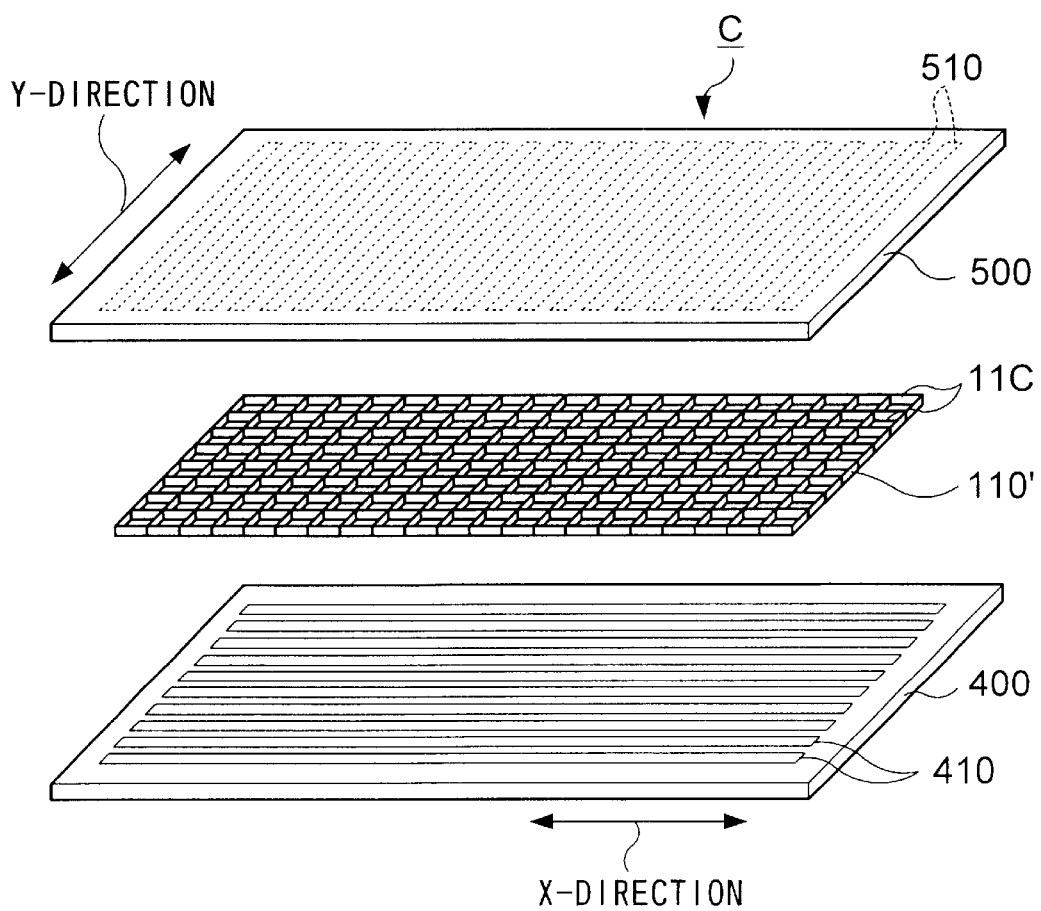
FIG. 21 is an exploded perspective view of a passive matrix type of electrophoretic display panel.

In each embodiment described above, the active matrix type of electrophoretic display panels A and B with the TFTs 103 have been exemplified. However the present invention is not restricted to this type of panel and may be applied to a passive matrix type of panel in which row electrodes and column electrodes are placed. FIG. 21 is an exploded perspective view of a passive matrix type of electrophoretic display panel. As shown therein, the electrophoretic display panel C of this type has a first substrate on which a plurality of row electrodes 410 are formed in the X-direction, a second electrode 500 on which a plurality of column electrodes 510 are formed in the Y-direction, and a bulkhead 110' positioned between both substrates. The bulkhead 110' has a plurality of divided cells 11C, each divided cell 11C is charged with the dispersion 1 and sealed with a not-shown sealer.

Both of the first and second substrates 400 and 500 are made from, for example, glass-made substrates, while at least one of the row and column electrodes 410 and 510 are made into transparent electrodes. A side of the electrophoretic display panel C, to which the transparent electrode is faced, provides a display surface thereof. In this configuration, the column electrodes 510 are formed into transparent ones, so the upper surface of the second substrate 500 serves as the display surface.

In this panel C, one pixel includes both of electrode portions positioned at an intersected region made by both of each row electrode 410 and each column electrode 510 and the dispersion 1 sandwiched therebetween. In this panel C, the pixels are made to correspond to the divided cells 11C one by one. The row electrodes 410 are selected in sequence every period of the horizontal scanning, while the column electrodes 510 are selected in sequence during one period of the horizontal scanning. Responsively to such selection, a positive row-selecting voltage and a negative column-selecting voltage are applied to a certain pixel corresponding to an intersection made between selected row and column electrodes 410 and 510. Responsively to this, the electrophoretic particles 3 migrate according to a difference in those voltages. Therefore, pixel by pixel, the electrophoretic particles 3 are floated upward to the side the display surface (column electrodes 510) or sunk downward, desired images being displayed.

In this case, it is preferable that the electrophoretic particles 3 have a threshold. This is based on the following reason. During a period of selection of a certain row electrode 410, all the pixels belonging to this row have a row-selecting voltage. In such a case, it is desired that the electrophoretic particles 3 are prevented from migrating at the remaining pixels other than a certain pixel to which a column-selecting voltage is applied. The threshold of the electrophoretic particles 3 can avoid such undesired migrations.

The above electrophoretic display panel C can be manufactured in the similar manner to that in the first or second embodiment. For example, in the case of producing the panel C through the production method described in the first embodiment, the first process shown in FIG. 4A is carried out under an altered situation. That is, the element substrate 100 on which the TFTs 103 are formed is replaced by the first substrate 400 on which the row electrodes 410 are formed, while the opposing substrate 200 is replaced by the second substrate 500 on which the column electrodes 510 are formed. In the second process shown in FIG. 4B, the bulkhead 110' is formed on the second substrate 500 by performing etching for a photosensitive polyimide precursor, as described in the first embodiment. Then, in the third process shown in FIG. 4C, the ink jet type of dispersion charging apparatus 10 is used to charge the dispersion 1 into each divided cell 11C. In the fourth process shown in FIG. 4D, the bulkhead 110' is then sealed. In the fifth process shown in FIG. 4E, both of the first and second substrates 400 and 500 are finally applied to each other with their electrodes faced to each other.

On the other hand, in the case that the electrophoretic display panel C is manufactured using the production method detailed in the second embodiment, the bulkhead 110' is first made using the stamper 300 (refer to FIG. 18). This bulkhead 110' is applied to either the first substrate 400 with the row electrodes 410 or the second substrate 500 with the column electrodes 510. Then, like the third process of the second embodiment shown in FIG. 17C, the ink jet type of dispersion charging apparatus 10 is used for discharging the dispersion 1 into each divided cell 11C. Further, in the fourth process shown in FIG. 17D, the bulkhead 110' is sealed. Finally, in the fifth process shown in FIG. 17E, both of the first and second substrates 400 and 500 are applied to each other with their electrodes faced to each other.

As seen from the above, like the active matrix type of electrophoretic display panels A and B, the passive matrix type of electrophoretic display panel C is able to charge the dispersion 1 into each divided cell 11C using the ink jet type of dispersion charging apparatus 10. This will lead to manufacturing of the electrophoretic display panel C at a higher rate of productivity.

(3.2) Correspondence between divided cells and pixels

In any of the foregoing electrophoretic display panels A, B and C, the divided cells 11C are made to correspond to the pixels on a one-by-one basis. The present invention is not confined to such a correspondence, but one divided cell 1 can be made to correspond to a plurality of pixels.

Figure 22:
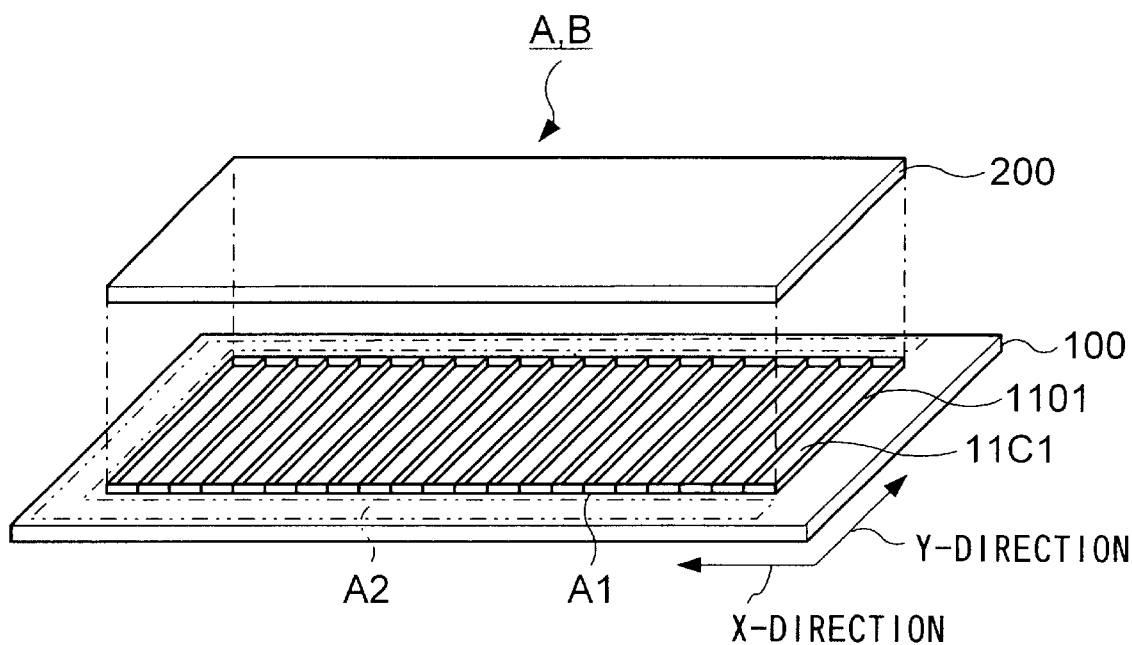
FIG. 22 is an exploded perspective view of an active matrix type of electrophoretic display panel that uses a bulkhead in which strip-like divided cells are disposed in parallel with each other.
Figure 23:
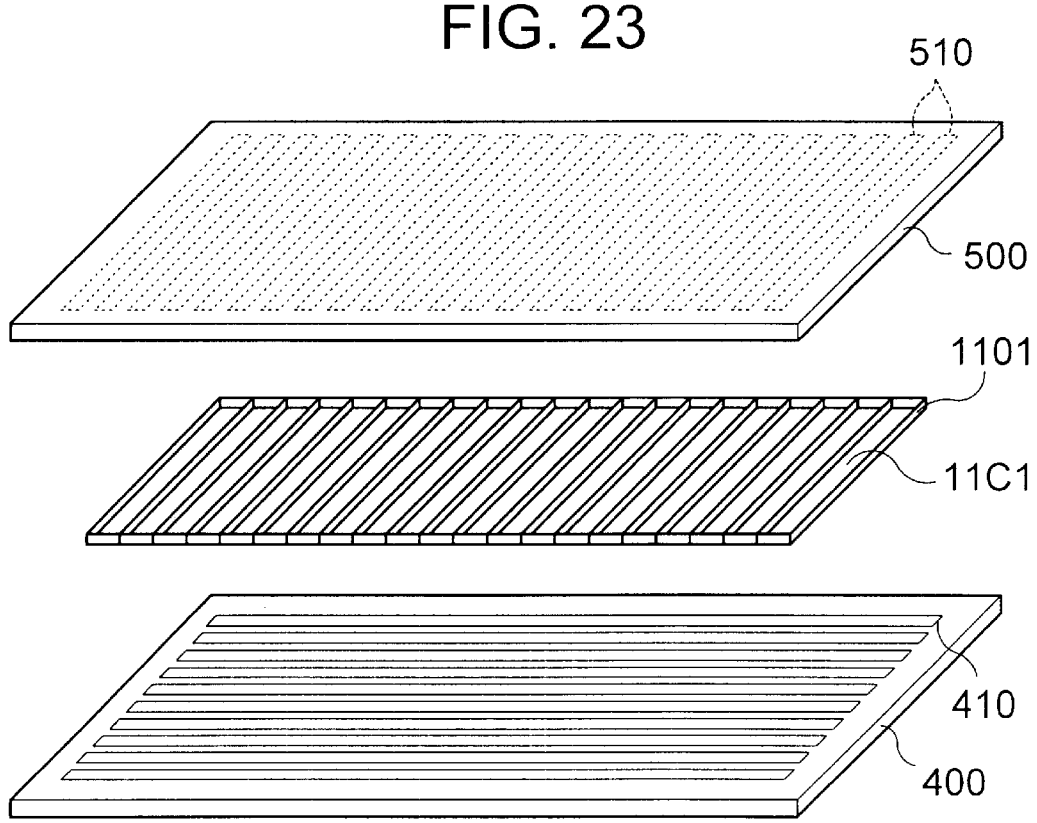
FIG. 23 is an exploded perspective view of a passive matrix type of electrophoretic display panel that uses a bulkhead in which strip-like divided cells are disposed in parallel with each other.

For instance, as shown in FIG. 22, the electrophoretic display panels A and B may be constructed using bulkhead 1101 in which a plurality of strip-like divided cells 11C1 each elongated in the Y-direction. Also, as shown in FIG. 23, the electrophoretic display panel C may be constructed using the similar bulkhead 1101. For producing these panels, the ink jet type of dispersion charging apparatus 10 is used to eject the dispersion 1 into each divided cell 11C1, thus the dispersion 1 being charged. For realizing display in colors, a stripe type of pixel configuration is available, in which the strip-like divided cells 11C1 are charged in turn with the dispersion 1 dyed in red (R), green (G) and blue (B).

Figure 24:
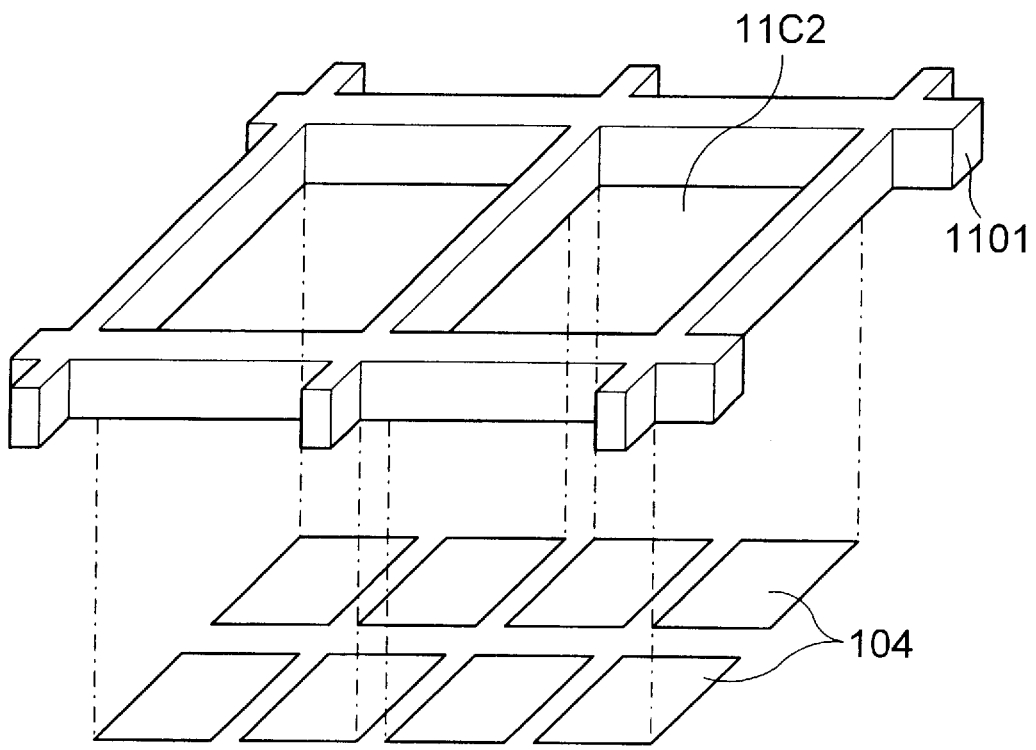
FIG. 24 exemplifies one relationship between the bulkhead and pixels.

Alternatively, as shown in FIG. 24, a plurality of pixels contiguously positioned (in this example, four pixels) may be grouped into one block, in which a divided cell 11C2 corresponding to each block is arranged.

Figure 25:
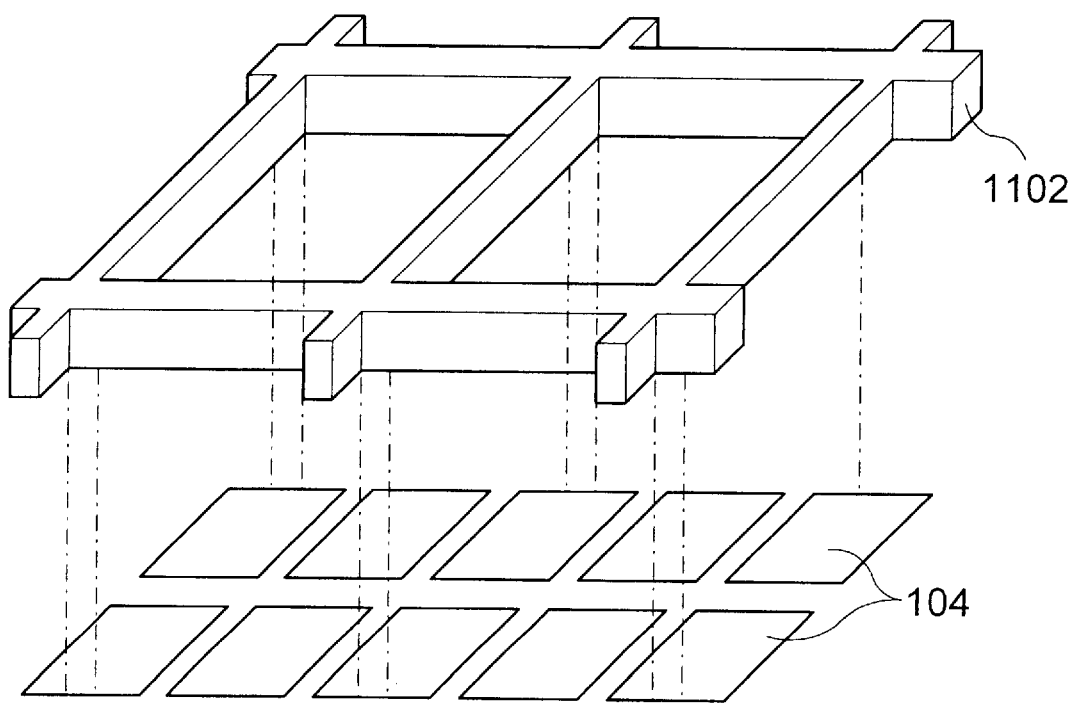
FIG. 25 exemplifies another relationship between the bulkhead and pixels.

In the foregoing example, the bulkheads 110, 110' and 1101 are disposed at a boundary between pixels, but this can be modified as shown in FIG. 25, wherein a bulkhead 1102 is disposed partly across pixels. In the case of disposing the bulkhead 1102 in such a geometry, a rate of aperture is lowered by an amount of thickness of the bulkhead 1102. In contrast, when the bulkhead is disposed partly or entirely at only the boundary of each pixel, the rate of aperture can be increased.

(3.3) Technique of sealing bulkhead

Other techniques of sealing the bulkhead, which are used in the production of the electrophoretic display panels A, B and C described before, will now be explained.

Figure 26:
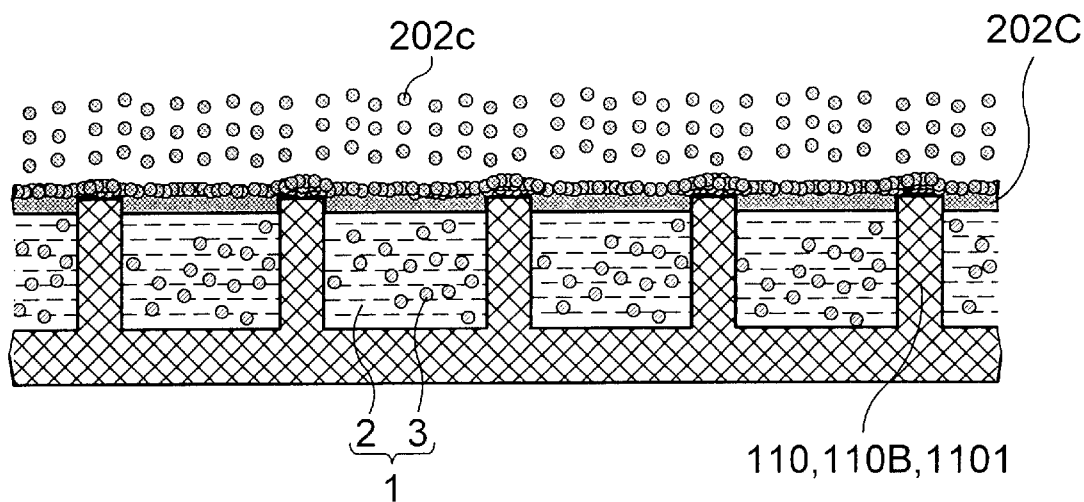
FIG. 26 is a partially shown sectional view to explain a first sealing technique of the bulkhead.

A first sealing technique uses a sealer less in weight than the dispersion 1. FIG. 26 is a view explaining the first sealing technique, in which an electrode is not shown. In this example, the dispersion 1 is w charged into the bulkhead 110, 110B, or 1101, then a sealer 202c is sprayed toward an opening side of the bulkhead. The sealer 202c is composed of a material which is less in specific gravity than the dispersion 1 and hardened by hardening. Which type of hardening should be employed is dependent on the type of the sealer 202. The hardening includes UV hardening, heat hardening, condensation-polymerization hardening, addition-polymerization hardening, or others.

When the sealer 202c is spayed, it is first mixed with the dispersion 1. However, because the sealer 202c is smaller in specific gravity than the dispersion 1, it will separate from the dispersion 1 after being left for a certain period of time, thus being collected together toward an upper part of the dispersion 1 and extracted. After the separation of the sealer 202c from the dispersion 1, hardening is performed for the sealer, so that the bulkhead 110, 110B or 1101 is sealed with a sealing layer 202C.

A variation may be configured such that material for the sealer 202c is added to the dispersion 1 beforehand, and using the ink jet type of dispersion charging apparatus 10, mixing material is charged into the bulkhead 110, 110B or 1101. In this case, the sealer 202c can be separated form the dispersion 1 after being left for a certain period of time.

In the case of the first sealing technique, there is no room for introducing bubbles into a gap between dispersion 1 and sealer 202c. Further, there is the advantage of forming the sealing layer 202C into a thin layer. As a result, higher-quality of panels can be manufactured with high reliability at a lower manufacturing cost.

Figure 27:
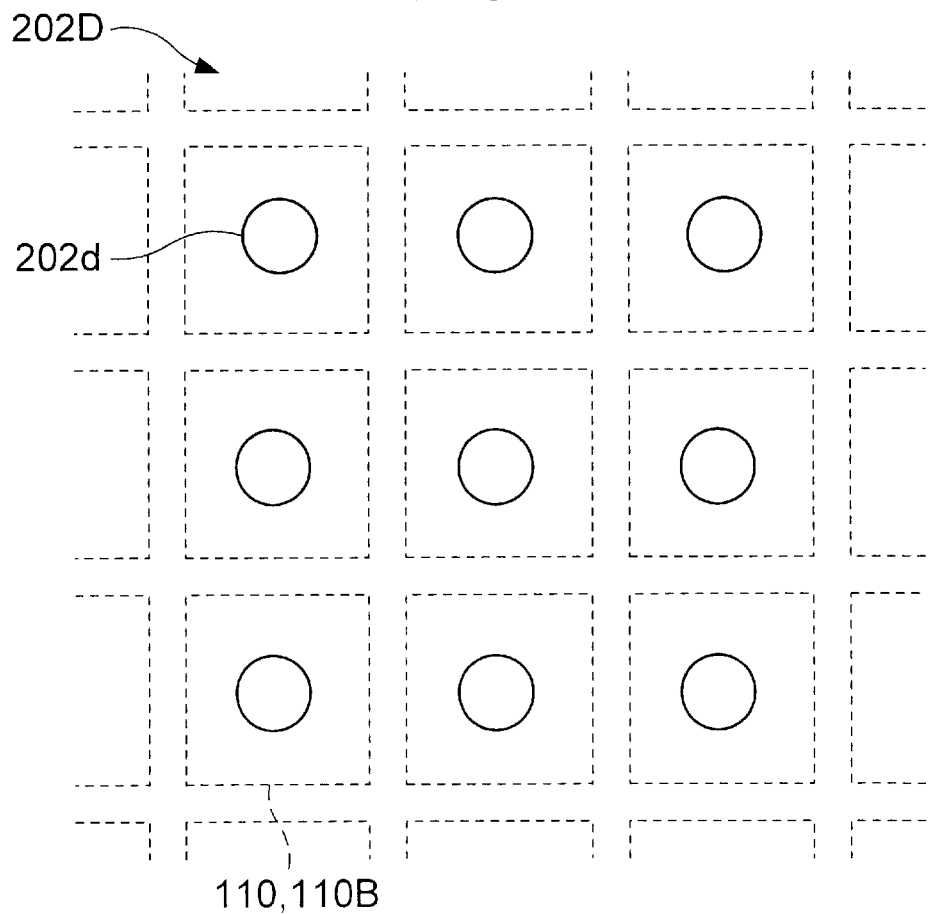
FIG. 27 is the plan view of a porous sheet used by a second sealing technique.

A second sealing technique will now be described. In using this technique, a porous sheet 202D shown in FIG. 27 is first made to adhere to an opening side of the bulkhead 110 or 110B. The porous sheet 202D has a plurality of pores 202d, each corresponding to each pixel, formed by processing such as etching or others explained in the first embodiment.

Figure 28:
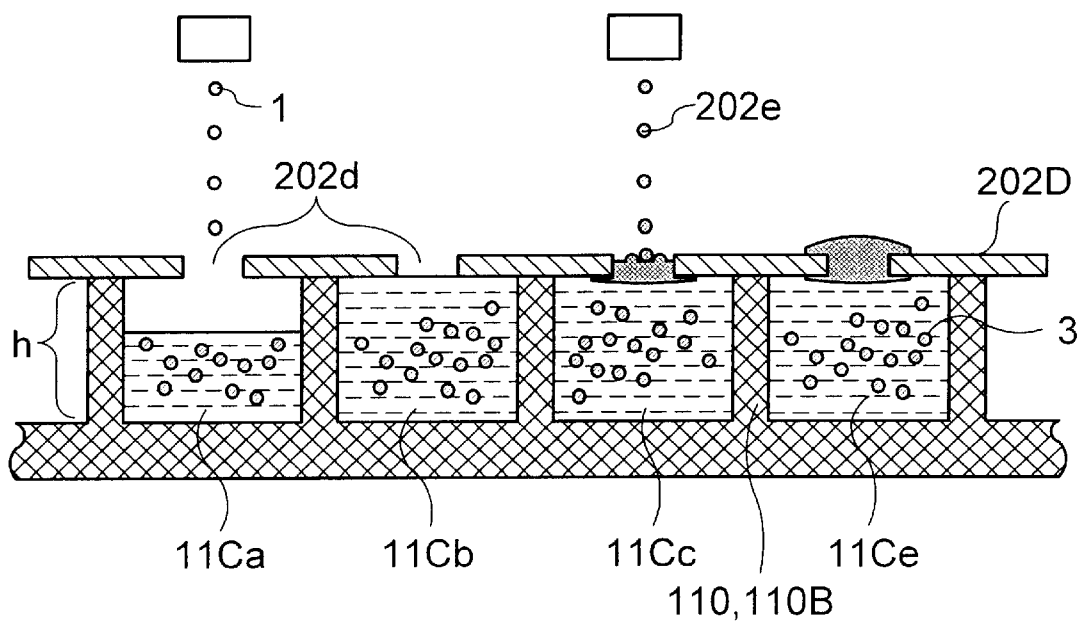
FIG. 28 illustrates sealing processes based on the second sealing technique.

As shown in FIG. 28, the ink jet type of dispersion charging apparatus 10 is then used to eject both of the dispersion 1 and a sealer 202e toward the pores 202d. In this process, the dispersion 1 is first filled into each divided cell 11C so that the dispersion reaches each pore 202d, and then the sealer 202e is ejected to each pore 202d to be sealed. FIG. 28 shows various examples, in which a first divided cell 11Ca is under charging with the dispersion 1; at a second divided cell 11Cb, charging the dispersion 1 has been completed; at a third divided cell 11Cc, its pore 202d is under sealing with the sealer 202e; and at a fourth divided cell 11Cd, the sealing has been completed.

When using this sealing technique, the dispersion 1 is always charged up to the height h of the bulkhead 110 or 110B. Hence, independently on the thickness of a sealer, a thickness of the dispersion 1 can be defined. This eliminates variations in thickness of the dispersion 1 at each pixel, making it possible to display images of which density is uniform at any time.

(3.4) Composition of dispersion

The foregoing embodiments have shown one example of compositions of the dispersion 1, but the dispersion of the present invention is not limited to the example. A variety of kinds of dispersion may be adopted.

For example, as the dispersion medium 2, in addition to a solvent medium used in electrodeposition paint or liquid developer for electrostatic images, a large number of other kinds of liquid can be used. Such kinds of liquid include water, alcoholic solvent like ethanol, ester like amyl acetate, terpene like turpentine, aliphatic hydrocarbon like petroleum, aromatic hydro carbon like toluene or benzene, or various kinds of oil. Furthermore, these kinds of liquid can be combined in a proper way and/or colored for use.

The electrophoretic particles 3 can include the following. First, as the while particles, usable are anatase- and rutile-type titanium dioxide, zinc oxide, magnesia oxide, silicon dioxide, barium titanate, barium sulfate, aluminum hydroxide, talc, or others. As the black particles, usable are carbon black, graphite, black oxide of iron, ivory black, chrome dioxide, or others.

As the red particles, usable are lake red C, lithol red, brilliant carmin 6B, azo-lake like watching red, non-soluble azo like permanent red 4R, iron oxide, antimony sulfide, cadmium celenide, red lead, or others. Also as the green particles, usable are phthalocyanine green, malachite green lake, naphthol green, emerald green, viridian, cobalt green, chromium oxide, or others. As the blue particles, usable are phthalocyanine blue, sky blue, indanthrene blue, ultramarine blue, cobalt blue, or others.

(3.5) Electronic devices

Electronic devices that incorporates the foregoing electrophoretic display panel A, B or C will now be explained.

(3.5.1) Electronic books

Figure 29:
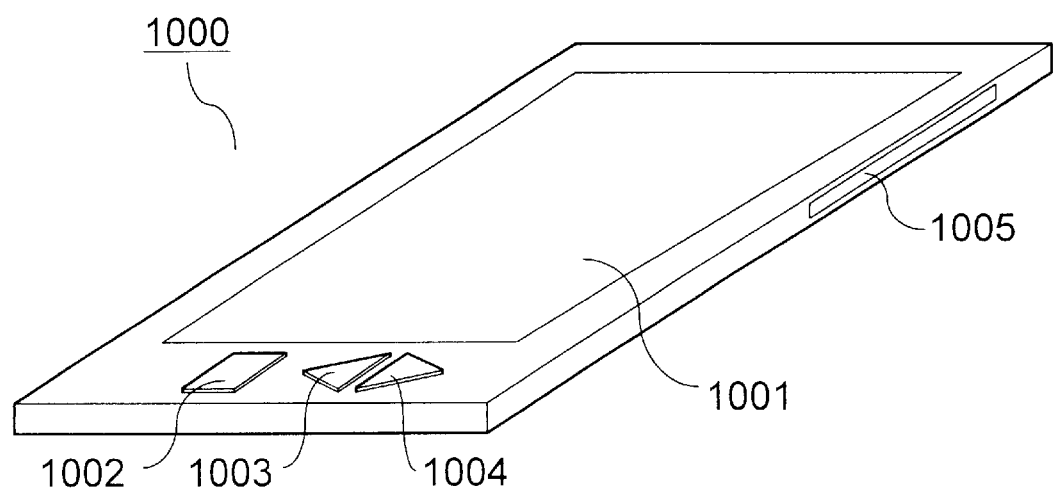
FIG. 29 is an external perspective view of an electronic book employed as one example of electronic devices according to the present invention.

Electronic books to which the foregoing electrophoretic display panel A, B or C is applied will now be exemplified. FIG. 29 is a perspective view showing an electronic book. This electronic book 1000 is provided with an electrophoretic display panel 1001, power switch 1002, fist button 1003, second button 1004, and CD-ROM slot 1005, as shown therein.

When a user presses the power switch 1002 and then loads a CD-ROM into the CD-ROM slot 1005, contents of the CD-ROM are read out to display their menus on the electrophoretic display panel 1001. If the user operates the first and second buttons 1003 and 1004 in order to select a desired book, the first page of the selected book is displayed on the panel 1001. To scroll pages down, the second button 1004 is pressed, while to scroll pages up, the first button 1003 is pressed.

In this electronic book 1000, if a page of the book is once displayed on the panel screen, the displayed screen will be updated only when the first or second buttons 1003 or 1004 is operated. This results from the fact that, as stated before, the electrophoretic particles 3 will migrate in only the case that an electric field is applied. In other words, to sustain the same screen display, it is unnecessary to power it. Therefore, during only a period for updating displayed images, it is required to feed power to the driving circuits to drive the electrophoretic display panel 1001. Therefore, compared to liquid crystal displays, power consumption is greatly reduced.

Further, images are displayed on the panel 1001 by the electrophoretic particles 3 which behave as pigment particles, which is able to avoid an excessive brightness. It is therefore possible for the electronic book 1000 to accomplish quality in display identical to that gained by printed matters. There is less eyestrain even when people read through the panel 1001 for a long time.

(3.5.2) Personal computer

Figure 30:
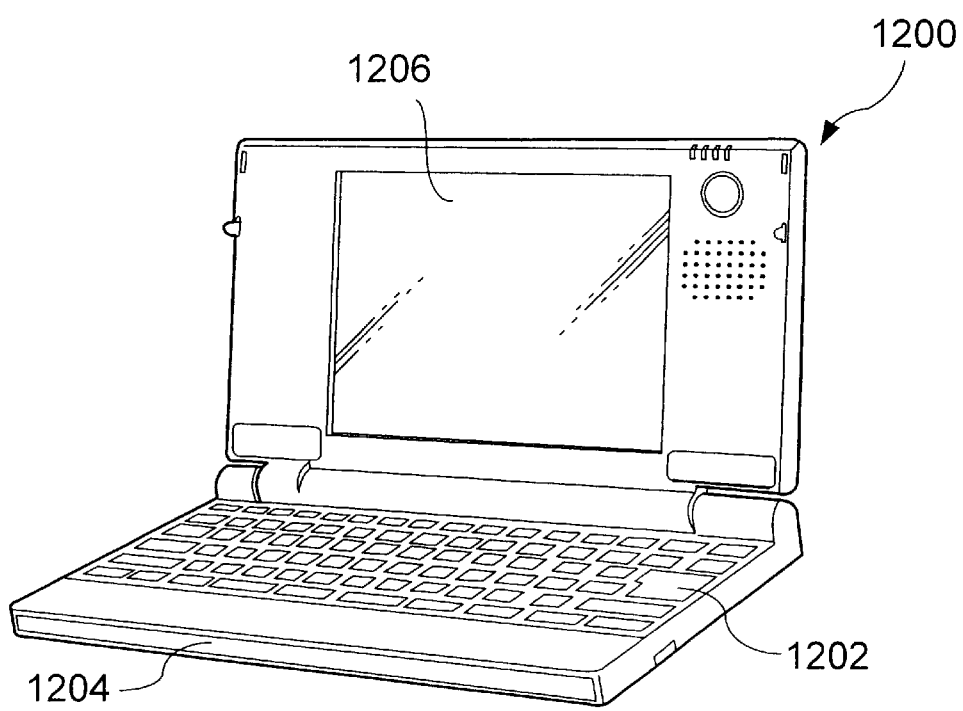
FIG. 30 is an external perspective view of a personal computer employed as another example of electronic devices according to the present invention.

A mobile type of personal computer into which the electrophoretic display panel A, B or C is practiced will now be exemplified. FIG. 30 is an external perspective view showing a personal computer. As shown therein, the computer 1200 has a main unit 1204 on which a keyboard 1202 is mounted and an electrophoretic display panel 1206. On the panel 1206, images are displayed by electrophoretic particles 3 which serve as pigment particles. Hence, it is unnecessary to mount a back light, which is always required by transmission type and semi-transmission type of liquid crystal displays, offering the computer 1200 less in weight and smaller in size, in addition to greatly decreased power consumption.

(3.5.3) Portable telephone

Figure 31:
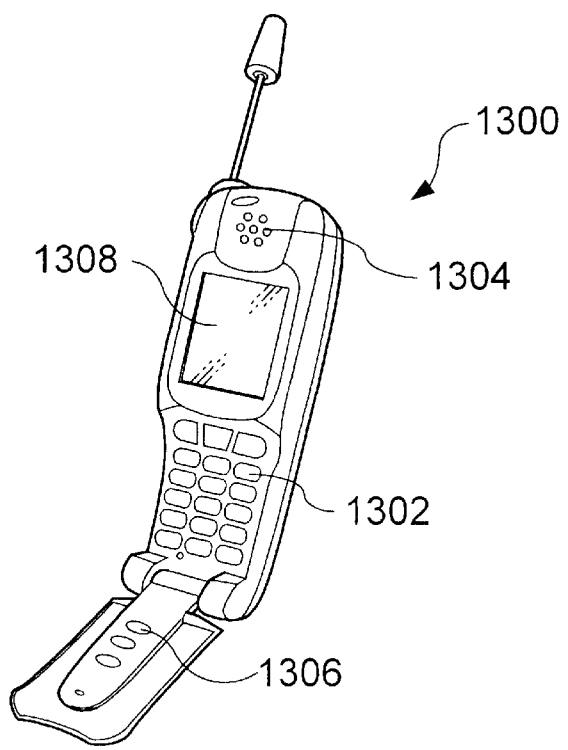
FIG. 31 is an external perspective view of a portable telephone employed as another example of electronic devices according to the present invention.

A portable telephone into which the electrophoretic display panel A, B or C is practiced will now be exemplified. FIG. 31 is a perspective view externally showing a portable telephone. As shown therein, a portable telephone 1300 is provided with a plurality of operation buttons 1302, an ear piece 1304, a mouth piece 1306, and an electrophoretic display panel 1308.

In liquid crystal displays, a polarizing plate is necessary always, which causes a display screen to be darkened. By contrast, it is unnecessary for the electrophoretic display panel 1308 to mount such a polarizing plate. Hence the portable telephone 1300 is able to offer an easy-to-see bright screen.

Electronic devices other than those shown in FIGS. 29 to 31 include a TV monitor, outdoor advertising board, traffic sign, view-finder type or monitor-direct-viewing type of vide tape recorder, car navigation device, pager, electronic note, electronic calculator, word processor, work station, TV telephone, POS terminal, devices having a touch panel, and others. To those devices, the electrophoretic display panel according to each of the foregoing embodiments is applied. Alternatively, an electro-optical apparatuses having such panel is applied to those devices as well.

Therefore, according to the present invention, the electrophoretic display panel can be manufactured with ease.

What is claimed is:

1. A method for producing an electrophoretic display, the method comprising:

providing a bulkhead on a substrate so as to partition a space on the substrate into a plurality of divided cells; and ejecting a dispersion containing electrophoretic particles toward an opening of the bulkhead as a droplet, to charge the divided cells with the dispersion.

2. A method for producing an electrophoretic display, the method comprising:

providing a bulkhead on a first substrate so as to partition a space on the substrate into a plurality of divided cells;

ejecting a dispersion containing electrophoretic particles toward an opening of the bulkhead as a droplet, to charge the divided cells with the dispersion;

sealing the opening of the bulkhead with a sealer; and applying a second substrate to the sealed first substrate.

3. A method of claim 2, further comprising processes of forming, on one of surfaces of the first substrate, a plurality of data lines, a plurality of scanning lines, a plurality of switching elements each placed according to each of intersections made between the scanning lines and the data lines, and a plurality of pixel electrodes each electrically connected with each switching element, the processes being carried out before the bulkhead is formed on the one of the surfaces of the first substrate.

4. A method of claim 3, wherein the second substrate is transparent, and the method further comprises a process of forming a transparent common electrode onto the second substrate before the second substrate is applied to the sealed first substrate.

5. A method of claim 3, wherein conductivity is partly or entirely given to the bulkhead, of which conductive part is used as a common electrode paired with the pixel electrodes.

6. A method of claim 3, wherein the sealer has conductivity and is used as a common electrode paired with pixel electrodes.

7. A method of claim 3, wherein the sealing process includes a process of sealing the opening of the bulkhead using a non-conductive sealer employed as the sealer, and a process of giving conductivity to the non-conductive sealer.

8. A method of claim 2, further comprising:
forming either one of a plurality of row electrodes or a plurality of column electrodes on one of surfaces of the first substrate before the bulkhead is formed onto the one of the surfaces of the first substrate; and
forming the other of the plurality of row electrodes and the plurality of column electrodes on the second substrate before the second substrate is applied to the sealed first substrate.

9. A method of claim 2, wherein, in the ejecting process, a material of the bulkhead is ejected toward the first substrate as the droplet, thereby the bulkhead being formed.

10. A method of claim 2, further comprising the process of forming the bulkhead by pressing a material of the bulkhead with a stamper.

11. A method of claim 10, wherein a plurality of data lines, a plurality of scanning lines, a plurality of switching elements each placed according to each of intersections made between the scanning lines and the data lines, and a plurality of pixel electrodes each electrically connected with each switching element are previously formed on the second substrate, and the bulkhead forming process includes a process of applying the bulkhead formed by the stamper to the first substrate.

12. A method of claim 11, wherein the first substrate is transparent, and the method further comprises a process of previously forming on the first substrate a transparent common electrode paired with the pixel electrode.

13. A method of claim 11, wherein conductivity is partly or entirely given to the bulkhead, of which conductive part is used as a common electrode paired with the pixel electrodes.

14. A method of claim 11, wherein a material of the bulkhead is a sheet-like conductive member covered by a resin member,
further the bulkhead forming process comprising processes of:
pressing the material of the bulkhead with the stamper so that the divided cells are formed on one of surfaces of the conductive member, thereby the bulkhead being produced; and
applying the bulkhead to the first substrate so as to form the bulkhead on the first substrate, in which the conductive member is used as a common electrode paired with the pixel electrodes.

15. A method of claim 10, wherein a plurality of data lines, a plurality of scanning lines, a plurality of switching elements each placed according to each of intersections made between the scanning lines and the data lines, and a plurality of pixel electrodes each electrically connected with each switching element are previously formed on the second substrate, and the bulkhead forming process includes processes of:
coating the bulkhead formed by the stamper partly or entirely with a conductive material to form a coated bulkhead having a common electrode paired with the pixel electrodes; and
applying the coated bulkhead to the first substrate so as to make the first substrate having the coated bulkhead.

16. A method of claim 2, wherein the bulkhead is partly or entirely arranged at a boundary of pixels.

17. A method of claim 2, wherein the bulkhead is formed with a bulkhead material which is black.

18. A method of claim 2, wherein the sealer is made of material to be fluidized by heating,
wherein the sealing process includes processes of:
disposing the sealer at the opening of the bulkhead; and
sealing the opening of the bulkhead by heating the disposed sealer.

19. A method of claim 2, wherein the sealer is made of material not to be mixed with the dispersion,
wherein the sealing process includes processes of:
coating or spraying the sealer on the first substrate in which the dispersion is charged; and
sealing the opening of the bulkhead by hardening the sealer.

20. A method of claim 2, wherein the sealer is made of material greater in relative gravity than the dispersion and not to be mixed with the dispersion,
the ejecting process includes a process of ejecting, toward each of the divided cells, the dispersion to which the sealer is added, thereby both of the dispersion and the sealer being charged into the cells, and
the sealing process includes a process of sealing the opening of the bulkhead by hardening the sealer after the dispersion and the sealer are separated from each other in each of the divided cells.

21. A method of claim 2, further comprising a process of making a porous sheet having a plurality of pores adhere to the first substrate on which the bulkhead is formed,
wherein the ejecting process includes a process of ejecting the dispersion, as the droplet, through the pores toward the first substrate to which the porous sheet adheres, and
the sealing process includes a process of sealing the pores by ejecting the sealer as a droplet toward each pore.

22. An electrophoretic display for performing a desired display by changing a spatial state of electrophoretic particles pixel by pixel, comprising:
a bulkhead partitioned into a plurality of divided cells and disposed partly or entirely at a boundary of the pixels;
a dispersion containing the electrophoretic particles to be charged into each of the plurality of divided cells; and
a pair of electrodes fixedly sandwiching the dispersion, at least one electrode being transparent.

23. An electrophoretic display of claim 22, in which the display is made on a plurality of different hues each assigned to each pixel in accordance with a predetermined rule,
wherein the bulkhead is disposed at least at a boundary of pixels whose display hues are different from each other.

24. An electrophoretic display of claim 23, wherein the bulkhead is black.

25. An electrophoretic display of claim 22, comprising a sealer for sealing the charged dispersion.

26. An electrophoretic display of claim 25, wherein the sealer has conductivity and consists of the one electrode used in common with the sealer.

27. An electrophoretic display of claim 22, wherein the bulkhead has conductivity in partly or entirely, part of the bulkhead, which has conductivity, being used in common with the one electrode.

28. An electrophoretic display of claim 22, further comprising a first substrate on which a plurality of data lines, a plurality of scanning lines, a plurality of switching elements each disposed correspondingly to an intersection made between each scanning line and each data line, and a plurality of pixel electrodes each electrically connected with each switching element, and a second substrate on which a common electrode is formed, wherein the bulkhead is fixedly sandwiched between the first and second substrates, the one electrode being the common electrode and the other electrode being the pixel electrodes.

29. An electrophoretic display of claim 22, further comprising a first substrate on which a plurality of first electrodes are placed and a second substrate on which a plurality of second electrodes are placed, wherein the bulkhead is fixedly sandwiched between the first and second substrates.

30. An electric device provided with a electrophoretic display for performing a desired display by changing a spatial state of electrophoretic particles pixel by pixel, the electrophoretic display comprising:

a bulkhead partitioned into a plurality of divided cells and disposed partly or entirely at a boundary of the pixels;

dispersion containing the electrophoretic particles to be charged into each of the plurality of divided cells; and a pair of electrodes fixedly sandwiching the dispersion, at least one electrode being transparent.

* * * * *